US012625729B2

(12) United States Patent
Naredula et al.

(10) Patent No.: US 12,625,729 B2
(45) Date of Patent: May 12, 2026

(54) PACKET PROCESSING COMPUTATIONS UTILIZING A PRE-ALLOCATED MEMORY FUNCTION

(71) Applicant: Microsoft Technology Licensing, LLC, Redmond, WA (US)

(72) Inventors: Janardhana Reddy Naredula, Hyderabad (IN); Naresh Kumar Bade, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 871 days.

(21) Appl. No.: 17/752,790

(22) Filed: May 24, 2022

(65) Prior Publication Data

US 2023/0385111 A1     Nov. 30, 2023

(51) Int. Cl.
*G06F 9/50* (2006.01)

(52) U.S. Cl.
CPC .......... *G06F 9/5016* (2013.01); *G06F 9/5038* (2013.01); *G06F 9/505* (2013.01)

(58) Field of Classification Search
CPC ...... G06F 9/5016; G06F 9/5038; G06F 9/505; G06F 2212/7207; G06F 12/0246
See application file for complete search history.

(56) References Cited

U.S. PATENT DOCUMENTS

| | | | | |
|---|---|---|---|---|
| 10,278,112 | B1 * | 4/2019 | A | H04L 41/0866 |
| 2002/0095453 | A1 * | 7/2002 | Steensgaard | G06F 12/0269 718/107 |

| | | | | |
|---|---|---|---|---|
| 2008/0209154 | A1 * | 8/2008 | Schneider | G06F 12/023 711/170 |

(Continued)

OTHER PUBLICATIONS

"DPDK Documentation", Retrieved from: https://dpdk.readthedocs.io/_/downloads/en/v2.1.0/pdf/, Aug. 18, 2015, 528 Pages.

(Continued)

*Primary Examiner* — Lewis A Bullock, Jr.
*Assistant Examiner* — Kevin X Lu
(74) *Attorney, Agent, or Firm* — Ray Quinney & Nebeker P.C.; Christopher K. Hallstrom

(57) ABSTRACT

The present disclosure relates to systems, methods, and computer-readable media for utilizing a new memory allocation function library called PmemMalloc. For example, the PmemMalloc library allocates pre-allocated, partitioned, and fixed shared memory blocks. In addition, by utilizing the PmemMalloc library, the memory allocation system described herein overcomes problems with persistence and enumeration that encumber existing malloc libraries. Indeed, the PmemMalloc library enables the memory allocation system to perform servicing computation in parallel across multiple CPU cores/threads, distribute computation equally among threads, prioritize servicing, among other improvements. Notably, the PmemMalloc library provides major constructs (e.g., persistence, enumeration, and debugability) not available existing malloc libraries. Additionally, as detailed in this disclosure, the PmemMalloc library migrates various computations out of application-based packet processing to memory block-based deferred enumeration, which improves both packet processing and efficient use of CPU cores on a computing device.

20 Claims, 9 Drawing Sheets

(56)     References Cited

U.S. PATENT DOCUMENTS

| | | | | |
|---|---|---|---|---|
| 2020/0177660 | A1* | 6/2020 | Connor | ................. H04L 69/326 |
| 2020/0374744 | A1* | 11/2020 | Liu | ................... H04W 28/0268 |
| 2021/0011765 | A1* | 1/2021 | Doshi | ................... G06F 9/5077 |
| 2021/0089411 | A1* | 3/2021 | Prasad | ................ G06F 11/1471 |
| 2021/0271535 | A1 | 9/2021 | Ritchie et al. | |
| 2021/0342293 | A1* | 11/2021 | Waddington | .......... G06F 16/119 |
| 2022/0114084 | A1* | 4/2022 | Ritchie | .............. G06F 12/0253 |

OTHER PUBLICATIONS

"International Search Report and Written Opinion Issued in PCT Application No. PCT/US23/016786", Mailed Date: Jul. 10, 2023, 11 Pages.

* cited by examiner

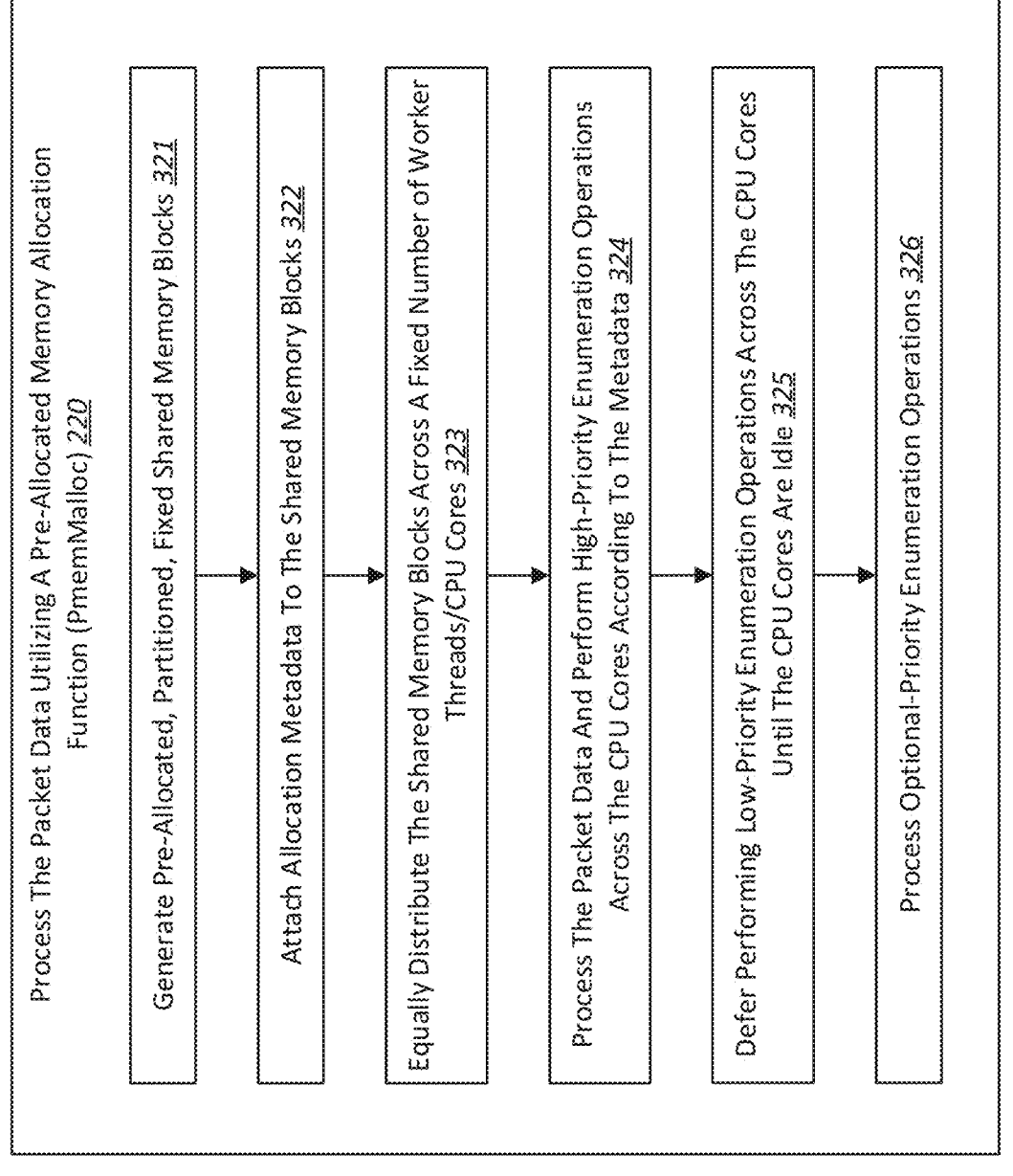

Process The Packet Data Utilizing A Pre-Allocated Memory Allocation Function (PmemMalloc) 220

Generate Pre-Allocated, Partitioned, Fixed Shared Memory Blocks 321

Attach Allocation Metadata To The Shared Memory Blocks 322

Equally Distribute The Shared Memory Blocks Across A Fixed Number of Worker Threads/CPU Cores 323

Process The Packet Data And Perform High-Priority Enumeration Operations Across The CPU Cores According To The Metadata 324

Defer Performing Low-Priority Enumeration Operations Across The CPU Cores Until The CPU Cores Are Idle 325

Process Optional-Priority Enumeration Operations 326

Receiving Packet Data At An Application _610_

Generating Pre-Allocated, Partitioned, And Fixed Shared Memory Blocks _620_

Attaching Metadata To The Shared Memory Blocks _630_

Performing Memory Operations Across The Shared Memory Blocks Based On The Metadata _640_

700

PACKET PROCESSING COMPUTATIONS UTILIZING A PRE-ALLOCATED MEMORY FUNCTION

BACKGROUND

Recent years have seen significant advancements in hardware and software platforms that implement network devices, such as those found in cloud computing systems. For instance, network devices often provide functions or services by receiving and processing incoming data packets. In some cases, one or more network applications (or simply "applications") on a network device process the incoming data packets. In many instances, these applications need to request memory from the network device to process the incoming data packets. Currently, applications like these rely on existing memory allocation function ("malloc") libraries, such as Glibc, jemalloc, and tcmalloc to allocate memory for packet data processing. However, existing malloc libraries face several technical shortcomings that result in inefficient, inaccurate, and inflexible operations.

To elaborate, existing malloc libraries do not provide persistent memory support or enumeration support, resulting in numerous problems. Indeed, existing malloc libraries are not designed to store heaps (i.e., heap memory) on persistent memory but rather, they dynamically allocate memory that is integrated with an Operating System (OS) and subject to OS interactions. As a result, memory and processing inaccuracies occur when data stored in memory is lost due to application restarts, when the OS overwrites or otherwise interferes with allocated data, or when other issues arise, as noted below.

Additionally, existing malloc libraries do not provide enumeration support, which increases processing time and reduces computational efficiency. This lack of enumeration support often results in inefficient serial processing of packet data, unequal CPU distribution, and memory locks. To elaborate, a server or virtual machine using existing malloc libraries allocates a number (e.g., four, eight, etc.) of CPU cores (e.g., worker threads) for processing packet data. For example, in a four-CPU core system, when an application calls an existing malloc library, existing malloc libraries horizontally split the CPU cores by allocating three of the cores to data processing while the fourth is used by the application for enumeration operations. Accordingly, in these cases, enumeration operations (or simply "enumeration") are rigidly restricted to a single CPU core and prevented from operating in parallel on the other CPU cores, even when the other CPU cores are underutilized. Additionally, due to using a single CPU core, memory locks, lock contentions, and memory access errors frequently occur with existing malloc libraries due to memory blocks being owned by other cores and/or heaps than those accessing them.

As additional examples of inefficiencies, existing malloc libraries suffer from unequal CPU utilization and poor distribution caused by enumeration. As noted above, enumeration often requires its own CPU cores, which cannot be used for packet processing. Thus, even if the enumeration core is idle or not fully engaged, existing malloc libraries do not allow packet processing to occur on idle CPU cores allocated to enumerations (and vice versa).

Further, many existing malloc libraries are inflexibly limited to passive sync functions (e.g., a synchronous programming model), which process packet data as they arrive regardless of processing importance. Because servicing computations are done synchronously, existing malloc libraries require O(N) computations due to serialization and de-serialization flows (e.g., in current servicing, all flows and objects are converted into new objects (e.g., at O(n)). As an example, with existing malloc libraries, processing 1 million packet data flows takes on average 40 seconds. Indeed, under existing malloc libraries, enumerations are performed serially on a single core and cannot be deferred and, as a result, processing throughput is greatly reduced.

These and other problems result in significant inefficiencies, inaccuracies, and inflexibilities of existing malloc libraries.

BRIEF DESCRIPTION OF THE DRAWINGS

The detailed description provides one or more implementations with additional specificity and detail through the use of the accompanying drawings, as briefly described below.

FIG. 3 illustrates a diagram processing packet data with the PmemMalloc library in accordance with one or more implementations.

DETAILED DESCRIPTION

Figure 1A:
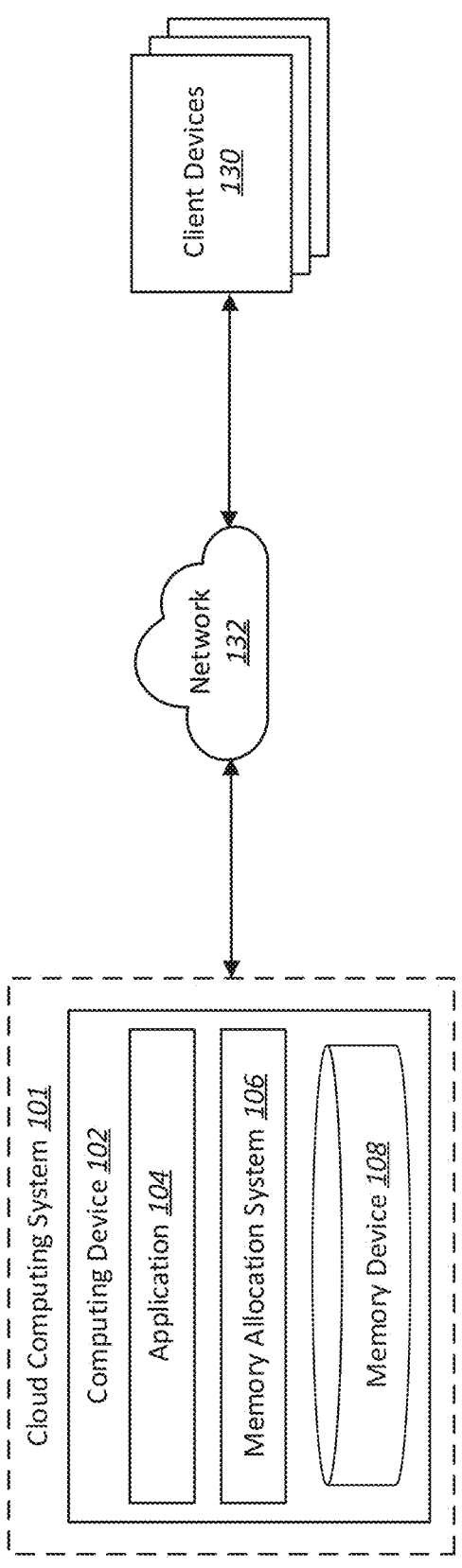
FIGS. 1A-1B illustrate a diagram of a computing system environment where a memory allocation system is implemented in accordance with one or more implementations.

Implementations of the present disclosure provide benefits and/or solve one or more of the foregoing or other problems in the art with systems, non-transitory computer-readable media, and methods utilizing a memory allocation system with a new memory allocation function library called PmemMalloc (or the PmemMalloc library). As described, the PmemMalloc library facilitates pre-allocated, partitioned, and fixed shared memory blocks. By utilizing the PmemMalloc library, the memory allocation system can overcome the problems described above with persistence and enumeration that encumber existing malloc libraries. Indeed, the PmemMalloc library enables the memory allocation system to perform servicing computation in parallel across multiple CPU cores/worker threads, distribute computations equally among threads, and prioritize/defer servicing, among other improvements. Notably, the PmemMalloc library provides major constructs (e.g., persistence, enumeration, and debuggability) not available existing malloc libraries.

As detailed below, the memory allocation system achieves persistence by implementing heaps on shared memory, In addition, the memory allocation system achieves highly-performant enumeration by splitting memory in a partitioned manner to each data thread, and attaching user metadata to each memory block. Further, the memory allocation system performs enumeration based on the constructs of 1) parallelism, 2) CPU equal distribution, 3) deferred ness, and 4)lockless-ness. Further, the memory allocation system achieves debuggability by reading shared memory along with metadata from outside.

As also detailed below, the memory allocation system provides enumeration functions that facilitate an application to migrate some of its computations from packet processing to deferred enumeration, which improves the through put of packet processing and makes efficient use of CPU cycles that would otherwise be idle. In addition, the memory allocation system also provides high-priority enumeration to facilitate enumeration running at high speed along with that of packet processing. As a result, the memory allocation system indirectly improves throughput by consuming more idle CPU cycles as long as there is more available memory for postponing the deferred operations.

To illustrate, in one or more implementations, the memory allocation system receives packet data at a network device that includes an application (e.g., a network application and/or a virtual application). In response to receiving the packet data, the memory allocation system can generate a memory heap within shared memory blocks that are preallocated, partitioned, and fixed. In addition, the memory allocation system can attach allocation metadata to each block of the shared memory blocks (e.g., that indicate an object type among other indicators) as well as perform memory operations across the shared memory blocks based on the allocation metadata.

As provided below, compared to conventional systems, the memory allocation system disclosed herein provides several technical benefits in terms of computing efficiency, accuracy, and flexibility. Indeed, the memory allocation system provides several practical applications that deliver benefits and/or solve problems associated with memory allocation on computing devices, including computing devices in a cloud computing system.

To elaborate, in one or more implementations, the Pmem-Malloc library provides significant efficiency improvements to packet servicing. For example, in various implementations, the memory allocation system utilizes the PmemMalloc library in a data plane development kit (DPDK) serverlike environment within a cloud computing system, as provided below. For example, the memory allocation system can receive packet data over a network device that comprises an application for processing the packet data.

As part of the processing (aka "servicing") incoming packet data, the PmemMalloc library can enable the memory allocation system to generate a memory heap within shared memory blocks, where the shared memory blocks are preallocated, partitioned, and fixed. Further, in various implementations, the memory allocation system equally distributes amounts of pre-allocated, fixed memory among the DPDK worker threads (e.g., CPU cores).

By utilizing memory heaps of shared memory blocks, the memory allocation system can overcome the persistence problem that hinders current memory allocation libraries. For example, unlike the existing malloc libraries, the use of shared memory provides data persistence, even across application restarts (i.e., reboots). Additionally, by utilizing shared memory, the memory allocation system avoids OS interaction as the shared memory is set apart (e.g., partitioned) from memory used by the OS (e.g., the memory heap of the shared memory blocks is pre-allocated without operating system integration). As a result, the OS will not overwrite or otherwise interfere with servicing operations.

Additionally, the memory allocation system provides significant efficiency gains to computing devices services packet data (e.g., packet flows). To illustrate, as noted above, existing memory allocation libraries operate at $O(n)$. In contrast, the memory allocation system operates at $O(1)$ as the shared memory removes the requirement for serialization and deserialization. In particular, while current servicing methods (e.g., existing malloc libraries) require all flows and objects to be converted into new objects before accepting packets from a network interface card (NIC) (which requires $O(n)$ operations), the memory allocation system defers packet these conversions such that packets are immediately accepted from the NIC, resulting in operations at $O(1)$. Thus, while existing malloc libraries take 40 seconds to service 1 million flows, the memory allocation system can service 1 million flows in 2 seconds (i.e., an efficiency gain of 20x).

Additional benefits of the PmemMalloc library include a small code footprint, especially with respect to the memory allocation system operating on DPDK-like servers. Similarly, the memory allocation system use of shared memory provides improved monitoring and debugging of object and data validation.

In various implementations, the memory allocation system can attach allocation metadata to each block of the shared memory blocks, which also improves operational efficiencies. For example, in one or more implementations, utilizing the PmemMalloc library, the memory allocation system can store a small amount of user-defined metadata with each shared memory block. Part of the metadata can include object types (e.g., stored data types), which allows the memory allocation system to select and efficiently service memory blocks having the object type together.

Moreover, by creating and utilizing pre-allocated partitioned memory, the memory allocation system also overcomes enumeration problems that inhibit existing malloc libraries. As noted above, existing malloc libraries do not directly support enumeration operations. In contrast, the memory allocation system and the PmemMalloc library provide enhanced and direct enumeration support. As described below, the memory allocation system provides parallel computation, distributed computation among worker threads, memory computation without locks, deferred computation, and improved CPU usage.

To elaborate, the memory allocation system provides improved parallel computation by enabling enumeration to occur across multiple CPU cores rather than on a single core. In various implementations, the memory allocation system shards packet data across the shared memory blocks and/or the CPU cores (e.g., four, eight, etc.) for parallel processing. In particular, rather than allocating a portion of CPU cores to packet processing and the remaining CPU cores to enumeration, the memory allocation system can use all the CPU cores for both packet processing and enumeration.

Similarly, the memory allocation system can provide improved CPU distribution across CPU cores. Because each of the CPU cores can be used for packet processing and enumeration, the memory allocation system can equally distribute the servicing task. Thus, the memory allocation system unlocks previously unutilized CPU cores for packet processing or enumeration that were otherwise wasted. Further, this allows for computations to be done on the CPU core where the memory is owned or created, which greatly improves efficiency.

In addition, the memory allocation system can reduce and improve CPU resource consumption by enabling lockless memory functions. Indeed, as a result of shared memory blocks that are independent of OS interference, the memory allocation system reduces memory locks as well as improves throughput by better utilizing previously idle CPU resources.

Further, the memory allocation system can improve servicing through deferred processing. For example, the memory allocation system introduces an active asynchronous programming model ("Active Async" or simply "Async") on top of conventional passive sync methods (e.g., synchronous programming models). In various implementations, the memory allocation system prioritizes enumeration operations and defers less important or time-sensitive tasks to be done when CPU cores are entering into idle cycles. Thus, based on priority levels of the enumeration operations, the memory allocation system processes high priority enumeration while deferring low priority enumeration until the CPU idle cycles start. As a result, CPU cores service the most important (e.g., higher priority) operations in real-time and/or first while also reducing idle CPU time by deferred lower priority enumeration operations.

As noted above, by utilizing shared memory, the memory allocation system can solve the persistence problems of existing malloc libraries mentioned above. Indeed, the memory allocation system does not need to perform serialization or de-serialization as the shared memory is accessible and processes can be easily attached to it. Further, by pre-allocating and partitioning the shared memory (e.g., proportionate to the number of CPU cores/threads), the memory allocation system can solve the enumeration problem mentioned above. For example, the memory allocation system retains the goodness of DPDK-like servers where packets from the NIC can be shared to all of the CPU cores, performs operations more quickly due to no OS interaction, runs enumeration on all CPU cores in parallel with equal CPU distribution, operates in lockless mode, and defers lower or optional enumeration tasks for when the CPU cores would otherwise be idle.

As illustrated in the foregoing discussion, the present disclosure utilizes a variety of terms to describe the features and advantages of one or more implementations described herein. For instance, as used herein, a "cloud computing system" refers to a network of connected computing devices (e.g., network devices) that provide various services to client devices. For instance, a cloud computing system can be a distributed computing system that includes a collection of physical server devices (e.g., server nodes) organized in a hierarchical structure including computing zones, clusters, virtual local area networks (VLANs), racks, load balancers, fault domains, etc.

In addition, features and functionality described in connection with cloud computing systems can similarly relate to racks, fault domains, or other hierarchical structures of physical server devices. The cloud computing system may refer to a private or public cloud computing system. In some implementations, a cloud computing system can include an orchestrator that manages servers, server clusters, server racks, server nodes, and/or other server groups of computing devices. In various implementations, a computing device that includes one or more virtual machines (e.g., a "host device") can include a hypervisor that facilitates hosting virtual machines on the host device.

As used herein, a "virtual machine" refers to an emulation of a computer system on a server node that provides the functionality of one or more applications on the cloud computing system. In various implementations, a host device allocates computing cores and/or memory to virtual machines running on the host device. Virtual machines can provide the functionality needed to execute one or more operating systems. In addition, virtual machines can utilize hypervisors on processors of server devices that support virtual replication of hardware. It will be understood that while specific examples and implementations features and functionality described herein with respect to virtual machines can likewise apply groups of virtual machines and/or compute instance types.

As used herein, an "application" refers to a virtual service provided by a cloud computing system. An application may be implemented on a virtual machine or another cloud computing device For example, a back plane of a cloud computing system may include an application for processing and/or servicing packet data. In some implementations, an application is a virtual application and/or a network application.

As used herein, "packet data," "data packets" or "packets" refer to data sent over a network. A series of packets can be called a packet flow or simply flow. Often, packets consist of control information (e.g., headers and trailers) and user data (e.g., payload).

As used herein, "shared memory" or "shared memory blocks" refers to memory on a computing device that may be accessed by multiple applications, CPU cores, worker threads, and/or programs. Shared memory blocks can be fixed in size, pre-allocated, and/or partitioned for an operating system. Additionally, multiple CPU cores (e.g., virtual and/or actual) can access the same blocks of shared memory, and/or seamlessly exchange stored data. Commonly, shared memory is random access memory (RAM).

Generally, memory heap refers to memory on a computing device residing in a free-floating region of memory used by applications, programs, and the operating system to store global variables. For example, global variables are stored in heap memory space when allocated via dynamic memory allocation. As used herein, however, the term "memory heap" refers to memory that is pre-allocated, fixed, portioned, and often part of shared memory. Commonly, a memory heap is random access memory (RAM).

As used herein, a "memory allocation function library" or simply "malloc" refers to a library of functions used to allocate blocks of memory on the heap. An application or program accesses a block of memory via a pointer returned by a malloc function or call. When the memory is no longer needed, the pointer is passed to a "free" function to deallocate the memory so that it can be otherwise used.

As used herein, a "PmemMalloc library" refers to a library of improved functions for allocating memory blocks. In various implementations, the PmemMalloc library includes functions from malloc (or works in conjunction with malloc) as well as includes additional functions and features. In some implementations, the PmemMalloc library includes or operates in connection with active async (e.g., an active asynchronous programming model). While a PmemMalloc library facilitates the operations of PmemMalloc functions, the term "PmemMalloc library" can be used to indicate utilizing PmemMalloc functions.

Similarly, as used herein, "PmemMalloc" refers to a memory allocator that utilizes the PmemMalloc library to pre-allocate blocks of shared memory. In some implementations, PmemMalloc allocates one or more fixed memory partitions to each DPDK worker thread (or simply "worker thread"). Further, PmemMalloc can allocate shared memory blocks that are portioned and fixed in size as well as can equally distribute the allocated shared memory blocks among the CPU cores/worker threads. In various implementations, when implemented on shared memory, PmemMalloc allows objects to persist across application reboots (e.g., restarts). In example implementations, PmemMalloc assigns computations so that they will be executed on the CPU core where the memory is located, which results in a computation lockless state. Additionally, PmemMalloc facilitates assigning the servicing computations so that the computations will be executed on the CPU core where the memory is located. As noted above, PmemMalloc allows for significant advantages and improvements over existing malloc libraries.

As used herein, "data plane development kit" (DPDK) refers to utilizing the PmemMalloc library in a data plane development kit (DPDK)-like server environment with a cloud computing system. For context, in some instances, a DPDK-like server includes software that provides a set of data plane libraries and NIC drivers for offloading TCP packet processing from the operating system kernel to processes running in another space (e.g., user space). In many implementations, DPDK-like servers have reserved resources (e.g., a fixed amount of memory, and CPU/worker threads). In example implementations, DPDK-like servers facilitate avoiding interaction with the operating system to improve throughput.

As used herein, "memory partition" refers to memory that is divided or partitioned among all the DPDK worker threads/CPU cores (e.g., CPU cores on a DPDK-like server). In one or more implementations, memory is partitioned equally among the DPDK worker threads/CPU cores. In various implementations, each DPDK worker thread/CPU core allocates and frees memory from its own partition without any lock contention.

As used herein, "memory operations" refers to operations performed on blocks of memory. Memory operation can include basic memory operations (aka "packet processing operations") such as malloc and free as supported by the malloc library and other exiting libraries (e.g., non-bulk operations). Memory operation can also include enumeration operations (or simply "enumerations"). The terms "bulk memory operations," "bulk operations," "enumeration," and "walking through memory" may be used interchangeably. Examples of enumeration/bulk memory operations include zero blocking, servicing with data structure change, object expiry, port delete, memory leak detection, etc.

As used herein, "allocation metadata" (or simply "metadata") refers to metadata generated and/or stored with partitioned memory blocks. In various implementations, allocation metadata includes a port number an object type, (e.g., a stored data type), an object version, a timestamp, application-specific data, and/or user-specific data. Object types can include dozens of different types of objects including various flows. In one or more implementations, the memory allocation system utilizes allocation metadata to filter and select shared memory blocks that include the same object types (e.g., all packets with the same metadata object type tag) for combined processing.

Figure 1B:
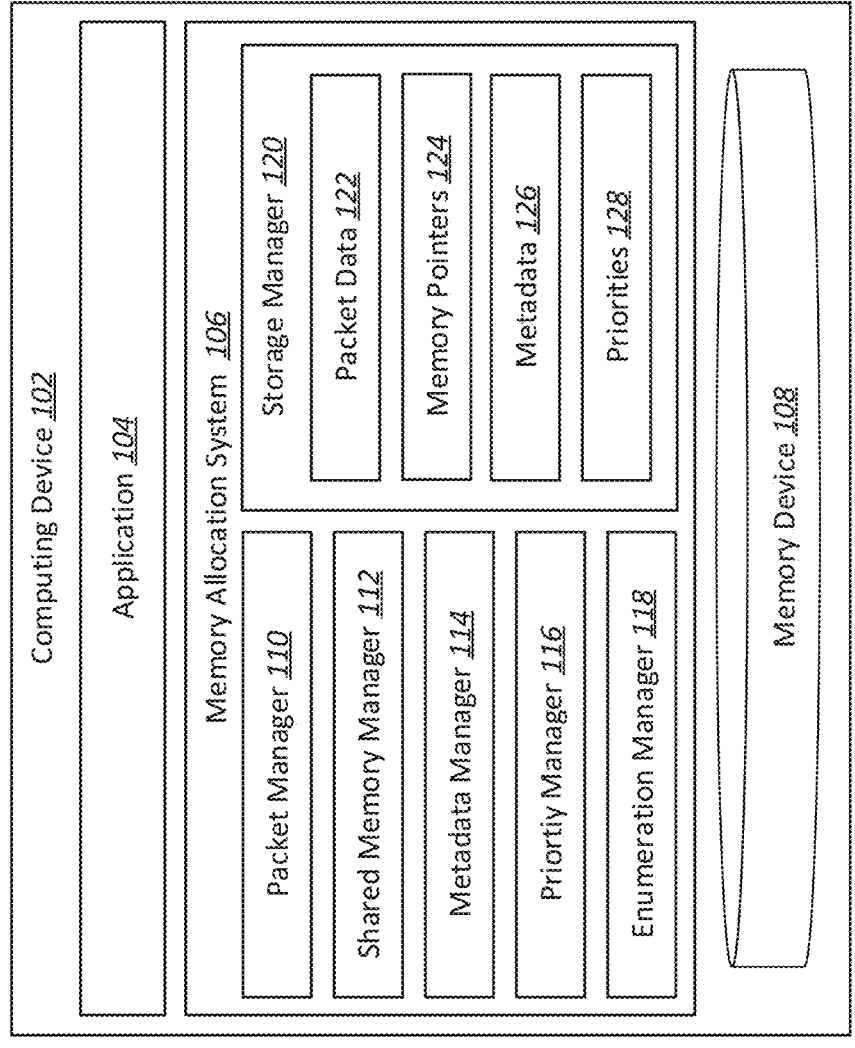

Additional detail will now be provided regarding the memory allocation system for improving the memory allocation and data packet servicing within a cloud computing system. For example, FIGS. 1A-1B illustrate a schematic diagram of an environment 100 (i.e., a digital medium system environment) for implementing a memory allocation system 106. As shown, FIG. 1A includes a cloud computing system 101 having a computing device 102, client devices 130, and a network 132. The computing device 102 can represent multiple computing devices (e.g., a node cluster having multiple server nodes) within the cloud computing system 101. Also, while not shown, in some implementations, the cloud computing system 101 includes a server device with an orchestrator that manages various functions within the cloud computing system 101, such as overseeing allocations, directing incoming network traffic to virtual machines, and/or otherwise managing operations within the cloud computing system 101.

As shown, the computing device 102 includes an application 104, a memory allocation system 106, and a memory device 108. For instance, the memory allocation system 106 provides functionality to the application 104 (e.g., a network or virtual application) to allocate memory from the memory device 108 for servicing data packets. For example, the memory allocation system 106 provides a PmemMalloc library to the application 104 that allows the application (and/or the memory allocation system 106) to create pre-allocated, partitioned, and fixed blocks of shared memory, as mentioned above. Additional detail regarding the memory allocation system 106 is provided below in connection with FIG. 1B.

As further shown, the environment 100 includes a plurality of client devices 130 in communication with the computing device 102 via the network 132. For example, one of the client devices 130 cause packet data to be sent to the computing device 102 for processing. In some implementations, the processed data is returned to one of the client devices 130. In some implementations, other data is returned to one of the client devices 130. In some implementations, the processed data is sent elsewhere and/or stored by the computing device 102.

In one or more implementations, the client devices 130 represents various types of computing devices including, by way of example, mobile devices, desktop computers, or other types of computing devices. In addition, the network 132 may include one or multiple networks that use one or more communication platforms or technologies for transmitting data. For example, the network 132 may include the Internet or other data link that enables the transport of electronic data between respective client devices and devices of the cloud computing system 101. Additional detail regarding these computing devices and networks is provided below in connection with FIG. 7. Additionally, while FIG. 1A illustrates a specific arrangement of the cloud computing system 101, the computing device 102, the client devices 130, and the network 132, the environment 100 can include any number of systems, computing devices, and/or networks.

As mentioned above, additional details regarding the memory allocation system 106 are provided in FIG. 1B. In particular, FIG. 1B illustrates the computing device 102 from FIG. 1A with components of the memory allocation system 106 added. As shown, the memory allocation system 106 includes a packet manager 110, a shared memory manager 112, a metadata manager 114, a prior manager 116, an enumeration manager 118, and a storage manager 120. As also shown, the storage manager 120 includes packet data 122, memory pointers 124, metadata 126, and priorities 128. While components are shown on the memory allocation system 106, in some implementations, one or more components are located elsewhere, such as on the application 104, on the computing device 102 itself, or outside of the computing device 102. Further, one or more of the components can belong to a PmemMalloc library.

As shown, the memory allocation system 106 includes the packet manager 110. In various implementations, the packet manager 110 receives, accesses, provides, edits, modifies, identifies, creates, or otherwise manages packet data 122. For example, the packet manager 110 can communicate with a NIC on the computing device 102 (e.g., a real or virtual NIC) to accept incoming data packets for the memory allocation system 106 to service, forward, or otherwise process.

In one or more implementations, the packet manager 110 can perform packet processing. For example, the packet manager 110 performs basic memory allocation library functions and operations on incoming packet data, as further described below. In some implementations, the packet manager 110 can also provide processed packet data to external computing devices.

As shown, the memory allocation system 106 includes the shared memory manager 112. In various implementations, the shared memory manager 112 facilitates creating, allocating, modifying, adding, removing, identifying, accessing, or otherwise managing shared memory blocks. For instance, in one or more implementations, in connection with processing packet data, the shared memory manager 112 pre-allocates fixed blocks of shared memory from the memory device 108 on the computing device 102. Further, the shared memory manager 112 can partition the shared memory blocks to be independent of the OS of the computing device 102 (e.g., not integrated with the OS). Additionally, the shared memory manager 112 can create and/or provide memory pointers 124 (e.g., one or more memory pointers) that indicate one or more locations of shared memory blocks within the memory device 108.

As shown, the memory allocation system 106 includes the metadata manager 114. In various implementations, the metadata manager 114 attaches, creates, identifies, edits, modifies, receives, accesses, provides, or otherwise manages the metadata 126 (e.g., allocation metadata). For example, the metadata manager 114 attaches allocation metadata to some or all of the pre-allocated, fixed, and partitioned shared memory blocks. In various implementations, the metadata manager 114 attaches metadata (e.g., user-defined metadata) to objects stored within the shared memory blocks.

In some implementations, the metadata manager 114 includes information about corresponding objects stored in the memory device 108. For example, the metadata manager 114 includes a port number, an object type, (e.g., a stored data type), an object version, a timestamp, application-specific data, and/or user-specific data within the metadata of an object and/or shared memory block. Further, in various implementations, the metadata manager 114 utilizes the metadata to identify and/or select objects and/or shared memory blocks that have a target metadata tag (e.g., find all shared memory blocks having a target object type).

As shown, the memory allocation system 106 includes the enumeration manager 118. In various implementations, the memory allocation system 106 performs enumerations, bulk operations, and memory walk-throughs as part of processing the packet data 122. Examples of enumeration operations include servicing with a data structure change, object expiry, port delete, etc. In some implementations, the enumeration manager 118 utilize functions from a PmemMalloc library to perform various enumeration operations.

In addition, the enumeration manager 118 can utilize the priorities 128 to determine when to service packet data. For example, the priorities 128 of a shared memory block and/or object can indicate a priority level of packet data (e.g., a high priority bulk operation, a low priority operation, and an optional priority operation) such that the enumeration manager 118 can determine when to optimally process it. Additional detail regarding enumerations and priority is provided below.

Additionally, the memory allocation system 106 includes the storage manager 120. In various implementations, the storage manager 120 can include any data used by any of the components of the memory allocation system 106 in performing features and functionality described herein. For example, the storage manager 120 may include the packet data 122, the memory pointers 124, the metadata 126, and the priorities 128, each of which is included above. In various implementations, the storage manager 120 also includes code and/or instructions for a PmemMalloc library.

Figure 2:
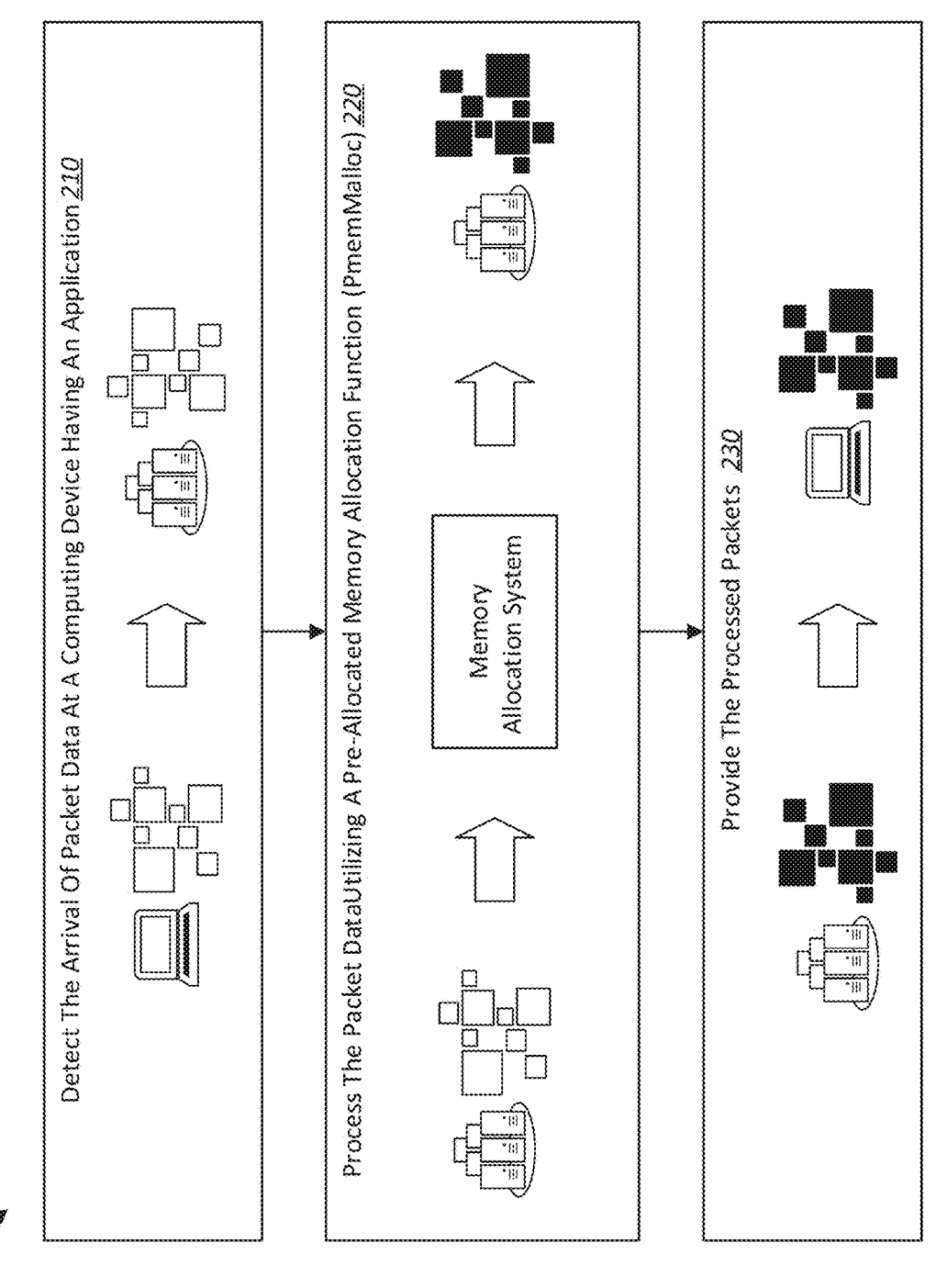
FIG. 2 illustrates an example workflow for utilizing a new memory allocation function library called PmemMalloc to process packet data in accordance with one or more implementations.

Additional detail in connection with an example implementation of the memory allocation system 106 is discussed in connection with FIG. 2. For example, FIG. 2 illustrates an example workflow for utilizing a new memory allocation function library called PmemMalloc to process packet data in accordance with one or more implementations. As shown, FIG. 2 illustrates a series of acts 200 of the memory allocation system 106 for processing packet data utilizing a PmemMalloc library.

As shown in FIG. 2, the series of acts 200 includes an act 210 of detecting the arrival of packet data at a computing device having an application, such as a network and/or virtual application. For example, in various implementations, the memory allocation system 106 receives packets from a NIC (e.g., real or virtual) and/or a poll mode driver. For example, one or more client devices cause packets to be provided to the memory allocation system 106 for processing.

In addition, FIG. 2 shows that the series of acts 200 includes an act 220 of processing the packet data utilizing a pre-allocated memory allocation function (PmemMalloc). For example, in one or more implementations, the memory allocation system 106 obtains pre-allocated, fixed, and partitioned shared memory blocks for the application. For instance, the memory allocation system 106 can assist in processing the packet data by providing the PmemMalloc library to the application and the application performs calls and utilizes functions from the PmemMalloc library. In some implementations, the memory allocation system 106 can equally distribute the shared memory with worker CPU cores/threads of the computing device.

In various implementations, the memory allocation system 106 performs packet processing of the data packets by sharding (e.g., splitting and sharing) the packets to all CPU cores/threads. Further, the memory allocation system 106 can perform various basic (e.g., non-bulk) memory operations on the packet data (e.g., flows), such as passive operations. In various implementations, the memory allocation system 106 can use all of the CPU cores/worker threads in an equal and distributed manner to perform packet processing operations. Additional detail regarding packet processing is provided below in connection with FIGS. 4A-4B.

In some implementations, the memory allocation system 106 additionally performs enumeration operations on the packet data. As noted above, the memory allocation system 106 can perform bulk operations across some or all of the CPU cores/threads in parallel and equally distributed across the CPU cores/threads based on functions in the PmemMalloc library. Further, the memory allocation system 106 can utilize passive and active programming models from the PmemMalloc library to prioritize higher-priority packet processing tasks while deferring lower-priority packet processing tasks, which improves CPU usage and packet processing efficiency. Additional detail regarding enumeration and PmemMalloc is provided below in connection with FIG. 3 (which is an expanded version of the act 220) and FIGS. 4A-4B.

As shown, the series of acts 200 includes an act 230 of providing the processed packets. For example, in some implementations, the memory allocation system 106 provides the processed data packets to a requesting client device. In some implementations, the memory allocation system 106 provides the processed data to other locations of a computing device, a cluster node, or elsewhere in the cloud computing system. In certain implementations, the memory allocation system 106 provides the processed data to a computing device outside of the cloud computing system.

As noted above, FIG. 3 provides additional detail regarding enumeration and PmemMalloc. In particular, FIG. 3 illustrates a diagram processing packet data with the PmemMalloc library in accordance with one or more implementations. As also noted above, FIG. 3 is an expanded version of the act 220 from FIG. 2 of processing received packet data utilizing a pre-allocated memory allocation function (PmemMalloc). In some implementations, an application (e.g., a network application) performs some or all of the sub-acts shown in FIG. 3 in connection with the memory allocation system 106.

As shown, the act 220 in FIG. 3 include several sub-acts including a first sub-act 321 of generating pre-allocated, partitioned, and fixed shared memory blocks. For example, in various implementations, the memory allocation system 106 receives packet data for processing, as described above. As part of processing the packet data, the memory allocation system 106 can create pre-allocated blocks of shared memory. Further, the memory allocation system 106 can partition the shared memory blocks and fix their size. In various implementations, the memory allocation system 106 applies the heap memory construct of existing malloc libraries to blocks of shared memory. In this manner, the memory allocation system 106 utilizes the known constructs of heap memory while adding the benefits of pre-allocated, fixed blocks of memory that are partitioned from the OS.

In connection with the first sub-act 321 of generating the shared memory blocks, the memory allocation system 106 can create and attach metadata to each of the shared memory blocks. Indeed, as shown, the series of acts 200 includes a sub-act 322 of attaching allocation metadata to the shared memory blocks. As described above, the metadata can indicate and/or tag the object type associated with each shared memory block (e.g., an object stored in a shared memory block). The metadata (e.g., allocation metadata) can also include other indicators, such as an object version, a timestamp, a port number used to process the object, application-specific data, and/or user-specific data.

In some implementations, the metadata includes a processing priority tag associated with an object. In alternative implementations, each object belongs to a priority level (e.g., objects are pre-assigned to either high, low, or optional priorities). Priory processing by the memory allocation system 106 is further described below.

As shown, the series of acts 200 includes a sub-act 323 of equally distributing the shared memory blocks across a fixed number of worker threads/CPU cores. For instance, in various implementations, the memory allocation system 106 pairs the shared memory blocks with CPU cores to enable efficient processing of received packet data. Further, because of the benefits provided by the shared memory blocks, the memory allocation system 106 does not have to horizontally split the CPU cores between either packet processing and enumeration, but can equally distribute the shared memory blocks across all of the CPU cores to be used for both packet processing and enumeration.

In various implementations, the memory allocation system 106 shards (e.g., copies and shares) the packet data to each of the shared memory blocks and/or CPU cores. In this manner, the CPU cores can maximize the processing of the data packets as each of the CPU cores has access to the packet data. Depending on the implementation, sharding may occur before or after the sub-act 323.

As shown, the series of acts 200 includes a sub-act 324 of processing the packet data and performing high-priority enumerations operations across the CPU cores according to the metadata. For instance, in various implementations, the memory allocation system 106 identifies packet data and/or objects that may require immediate and/or prioritized processing. In various implementations, the memory allocation system 106 identifies objects that need synchronous programming model functions (e.g., packet processing and passive sync operations) as well as objects needing high-priority async functions (e.g., high-priority enumeration operations).

In various implementations, the memory allocation system 106 utilizes the metadata attached to objects and/or the shared memory blocks to filter (e.g., identify) objects having an async high priority. In this manner, the memory allocation system 106 can first process and/or enumerate objects needing immediate attention while deferring lower priority or optional priority objects at a time when CPU resources are available.

In various implementations, the memory allocation system 106 facilitates parallel processing across each of the CPU cores. Thus, passive sync packet processing and/or high-priority enumeration operations can utilize all possible CPU resources without any of the CPU idly waiting because it is assigned to a different type of processing operation. Indeed, the memory allocation system 106 facilitates equal CPU distribution without memory locks.

In many implementations, the memory allocation system 106 utilizes metadata (e.g., allocation metadata) to apportion objects between the operation types. As noted above, metadata can include the stored data type (e.g., UF flow, LF flow, etc.), timestamp, port number, etc. Accordingly, in some implementations, when an application and/or the memory allocation system 106 creates the shared memory blocks (e.g., the first sub-act 321), it can create the metadata as a memory object and/or we tag the object with the object type tag (e.g., stored data type)(e.g., the sub-act 322). Then, during enumeration, the application 104 and/or memory allocation system 106 can identify and walkthrough (e.g., enumerate or bulk process) all objects and/or shared memory blocks of a particular object type (e.g., having the same metadata tag). Indeed, the memory allocation system 106 enables PmemMalloc to filter the required memory blocks based on the metadata and enumerate all the packets having a target metadata object type tag (e.g., process all packets with UF Flow, LF Flow, etc.)

Additionally, in some implementations, the memory allocation system 106 identifies objects needing high-priority enumeration operations based on the metadata. For example, the memory allocation system 106 classifies a first subset of object types as high-priority enumeration operations, a second subset of object types as low-priority enumeration operations, and/or a third subset of object types as optional-priority enumeration operations. In this manner, by identifying the metadata for an object and/or shared memory block, the memory allocation system 106 can know its processing priority.

As shown, the series of acts 200 includes a sub-act 325 of deferring performing low-priority enumerations operations across the CPU cores until the CPU cores are idle. For example, the memory allocation system 106 first processes the passive sync and high-priority async enumeration operations (e.g., high-priority bulk operations), then the memory allocation system 106 processes the low-priority async enumeration operations (low-priority bulk operations). In some implementations, the memory allocation system 106 waits until CPU idle time increase beyond or above a CPU utilization threshold level. Stated differently, the memory allocation system 106 can begin processing the—priority async enumeration operations when CPU utilization levels drop below the CPU utilization threshold level. Additional disclose about this subject matter is provided below.

In various implementations, deferred low-priority enumerations include two types. For example, deferred low-priority enumerations can include low-priority enumerations with indefinite deferredness. In these cases, even if the memory allocation system 106 does not utilize CPU cycles for a very long period, it defers the enumeration. Further, the memory allocation system 106 processes the nodes and/or memory blocks in the enumeration list by the packet processing over the period of time, taking them out of the enumeration and shrinking size of enumerations over the period of time (e.g., this can occur with data-structure change enumeration and address-remap enumeration). In example implementations, low-priority enumerations with indefinite deferredness is the only enumeration type where the node inside the list shrinks over the period of time because the node are processed by the packet processing.

Additionally, deferred low-priority enumerations can include low-priority enumerations with definite deferredness. For example, when the packet engine omits processing various nodes and/or memory blocks (e.g., object expiry enumerations) for a period of time, memory pressure begins to increase. Accordingly, the memory allocation system 106 can temporarily promote these enumerations (e.g., low-priority enumerations with definite deferredness) to the high-priority for a short time period until memory pressure decrease.

As shown, the series of acts 200 includes a sub-act 326 of processing optional-priority enumerations. For instance, in various implementations, the memory allocation system 106 identifies packet data and/or objects that would be useful to process given additional idle CPU cycles, but that are not essential to process. Indeed, optional enumerations refer to operations that are not guaranteed to be processed by the memory allocation system 106 and can be stopped due to insufficient resources.

Figure 4A:
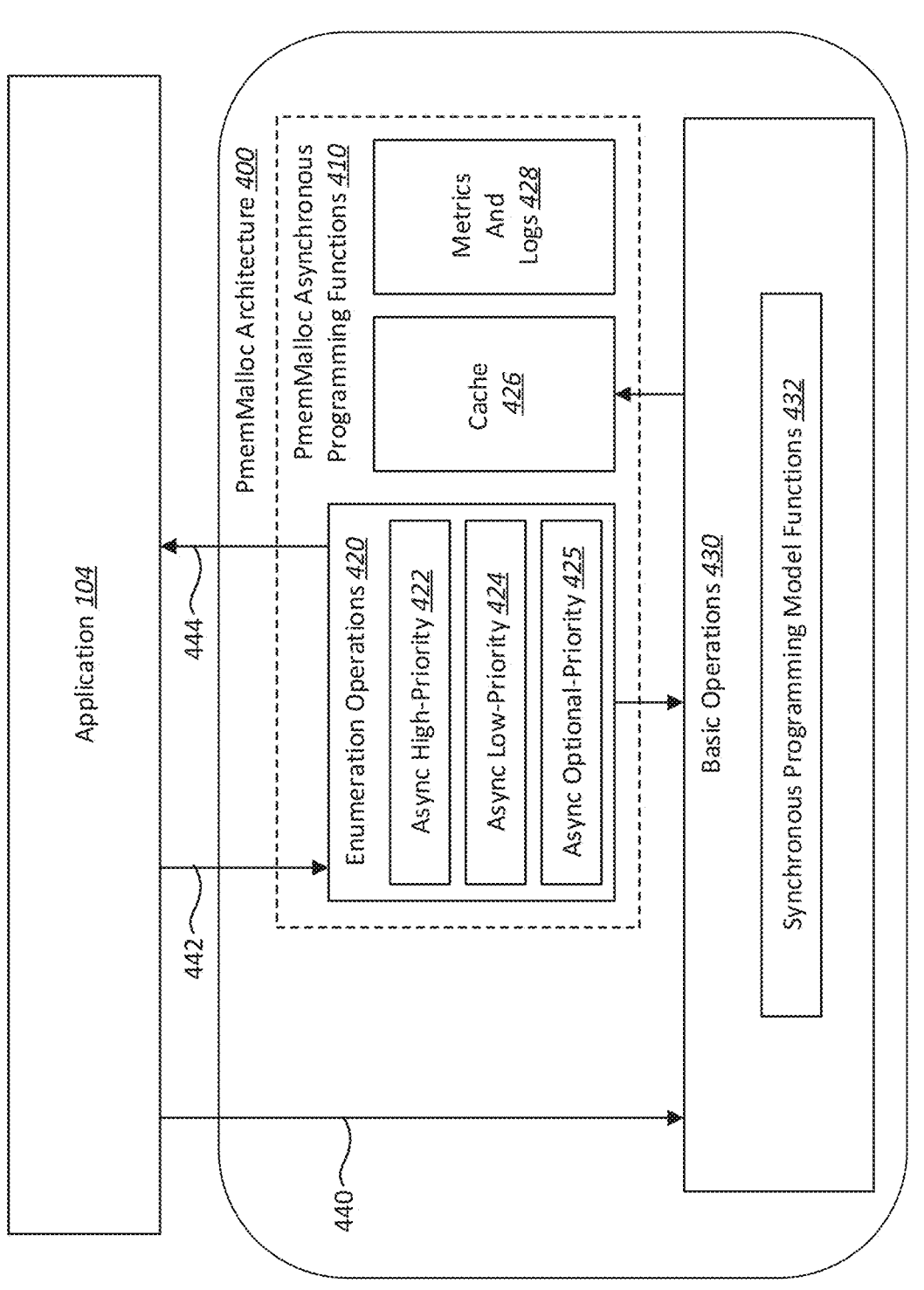
FIGS. 4A-4B illustrate an example architecture of a PmemMalloc function in accordance with one or more implementations.
Figure 4B:
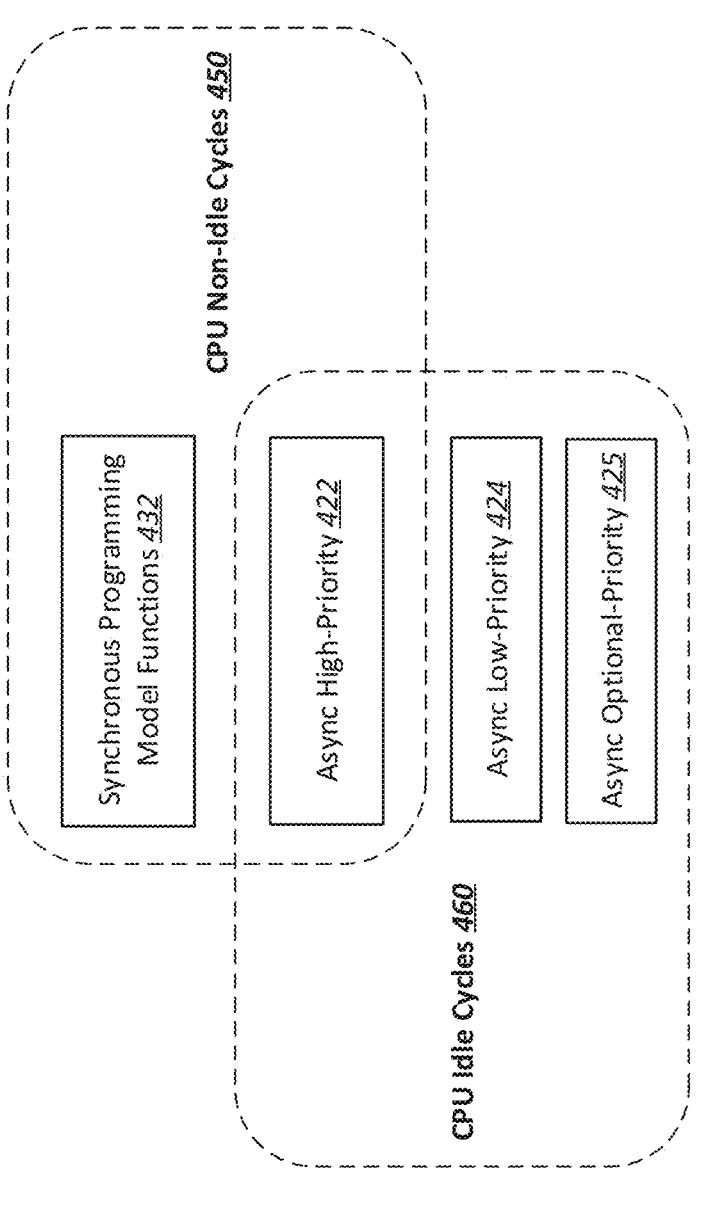

As mentioned above, FIGS. 4A-4B provides additional detail regarding packet processing, enumeration, and utilizing the PmemMalloc library. In particular, FIGS. 4A-4B illustrate an example architecture of a PmemMalloc function in accordance with one or more implementations. As shown, FIG. 4A includes the application 104 and PmemMalloc architecture 400. In some implementations, the application 104 is part of a back plane and/or virtual filtering platform (e.g., a virtual switch platform for a host software-defined networking in a cloud computing system).

In particular, the PmemMalloc architecture 400 includes basic operations 430, which can include synchronous programming model functions 432 (e.g., basic memory allocation operations). Indeed, the memory allocation system 106 can perform basic operations when a packet is received, such as creating a flow, updating it, or terminating it. Basic operations can be passive sync operations and similar to existing malloc libraries. However, the memory allocation system 106 differs in that PmemMalloc stores a small amount of metadata for each memory block, which the memory allocation system 106 utilizes to improve processing priorities, among other functions, as described below. In various implementations, the basic operations 430 represent a first memory operations module.

Additionally, the PmemMalloc architecture 400 includes PmemMalloc asynchronous programming functions 410 that include enumeration operations 420, a cache 426, and metrics and logs 428 (e.g., trans-logs). Further, the enumeration operations 420 includes various operations including async high-priority 422, async low-priority 424, and async optional-priority operations. In one or more implementations, the enumeration operations 420 represent enumeration (e.g., housekeeping) operations, such as registering and unregistering shared memory blocks.

In some implementations, the PmemMalloc asynchronous programming functions 410 represent a second memory operations module. Moreover, as shown, the PmemMalloc architecture 400 includes the second memory operations module built on top of the first memory operations module. Indeed, in one or more implementations, the active async module sits on top of the conventional passive sync method used for memory management (but uses heaps within pre-allocated shared memory rather than heaps in free-floating memory).

As shown in FIG. 4A, the PmemMalloc architecture 400 facilitates various API and/or operations calls from the application 104, shown as arrows 440-444. For example, the first arrow 440 can represent a malloc, free, open, or close call (e.g., supported by the malloc libraries) by the application 104. As described, unlike existing malloc libraries that rely on unpartitioned and non-pre-allocated heap memory, the memory allocation system 106 enables these calls to be made to pre-allocated shared memory blocks. Indeed, the basic operations 430 and/or synchronous programming model functions 432 can utilize heap memory created in shared memory blocks that is pre-allocated, fixed, partitioned, attached with metadata, etc.

In addition, as shown, the second arrow 442 can represent the application 104 bulk-register, bulk-unregister, bulk-run, or other bulk (e.g., enumeration) calls to the PmemMalloc asynchronous programming functions 410. In some implementations, the calls of the second arrow 442 correspond to a main loop. In additional implementations, the application 104 may perform one of the calls, such as bulk-run, during a CPU-idle state, which is described below. Indeed, because the memory allocation system 106 performs computations on the CPU core where the memory is owned or created, the memory allocation system 106 can perform these operations much more efficiently than existing malloc libraries.

Further, as shown, the third arrow 444 can represent the enumeration operations 420 and/or the PmemMalloc asynchronous programming functions 410 providing a callback to the application 104. For example, the memory allocation system 106 can provide processed data and/or an indication that data within the shared memory blocks has been serviced. In some implementations, because the PmemMalloc architecture 400 includes an asynchronous model, the memory allocation system 106 can execute enumerations (e.g., business/housekeeping functions) and/or non-infra code as part of the callback.

The following is an example algorithm for utilizing the PmemMalloc library on a virtual filtering platform (VFP).

1. If there is any change in the data structure (e.g., Unified Flow/Layered Flow data structures), the VFP starts as follows:
   a. Set flag service_inprogress=1 (this flag is set only when there is a change in the data structure.)
   b. Register and Start Enumeration in PmemMalloc.
2. If a packet is received and service_inprogress==1, do the following:
   a. Get the flow pointer from the hash table.
   b. Check PmemMalloc to see if the flow is patched or non-patched. (PmemMalloc knows if it patched or not based on metadata, which contains the version of UF/LF data structures)
   c. If it is non-patched, convert it into a new one using a transformative function.
   d. Transformative function—a computation-rich function to convert a flow from any version to any other version. This function is called in two contexts:
      i. during the processing of the packet synchronously, or
      ii. from the enumeration asynchronously.
         When all the flows are transformed, then service_inprogress is set to 0 and the transformation function will not be further called.
   e. The remainder of the computation is Processed in the current way.
3. If the packet is received and service_inprogress==0 do the following:
   a. Process the packet in the current way (e.g., step 2e).
4. Repeat Steps 2 and Steps 3.
5. During Object expiry, check service_inprogress==1 and perform actions similar to Step 2.
6. Active Async execution during CPU idle—Callbacks:
   a. When the Enumeration completes a full scan, it uses a callback to indicate that the walk is completed (e.g., inside the callback, the set service_inprogress=0).
   b. When an enumeration sees an unpatched object (the metadata is updated accordingly when an object is converted from an older version to a new version). It calls the callback, then. The callback converts an unpatched object to the new one, this is similar to step 2d.

VFP Servicing-Data Structure Algorithm

Similarly, the following is an example algorithm for an Enumeration Algorithm.

1. Register the Enumeration for object type: (e.g., unified flows of a port).
   a. Parameters: type of objects.
2. Walk all the memory blocks sequentially:
   b. If the type of object is matched, the callback is called.
3. Repeat step-2 till all blocks are walked.
4. Callback to indicate that the Walking is complete, at this point service_inprogress will become 0.

Enumeration Algorithm

While current servicing methods (e.g., existing malloc libraries) require all flows and objects to be converted into new objects before packets from a NIC will be accepted, requiring O(n) operations, the memory allocation system 106 defers packet conversions and immediately accepts then from the NIC, resulting in operations at O(1) (e.g., the memory allocation system 106 receives the packet data corresponding to the application from a NIC before flows are converted into new objects). Thus, while servicing 1 million flows takes 40 seconds with existing malloc libraries, the memory allocation system can service 1 million flows in 2 seconds.

As mentioned above, in example implementations, the memory allocation system 106 can improve efficiency by deferring less critical and/or time-sensitive tasks based on CPU usage. For example, unlike existing malloc libraries that are generic and not designed for memory-intensive applications, the memory allocation system 106 efficiently supports bulk memory operations (i.e., enumerations). Indeed, in many implementations, the memory allocation system 106 can perform memory computation without locks, distribute computation equally among threads, and walk through the memory blocks to perform computation during CPU idle cycles. To further illustrate, FIG. 4B shows a representation of CPU usage with respect to synchronous programming model functions and asynchronous programming model functions.

In one or more implementations, the memory allocation system 106 utilizes the active async model for bulk memory operations for a DPDK-like server. These bulk memory operations can include memory-intensive tasks and can require the walking of memory objects periodically for various operations like virtual filtering platform (VFP) servicing, port delete, object expiry, etc. Thus, while some of these operations are considered passive synchronize in existing malloc libraries and must be urgently processed, the memory allocation system 106 can defer one or more of these operations under the PmemMalloc library and the active async model. Indeed, as described below, the memory allocation system 106 can utilize the active async model to improve the efficiency of a computing device (e.g., a server) by splitting the computations into two processing sets that occurs at different times depending on CPU utilization.

To illustrate, FIG. 4B includes CPU non-idle cycles 450 and CPU idle cycles 460. During, CPU non-idle cycles 450, the memory allocation system 106 performs computation that cannot be deferred or postponed. For example, these computations need to be executed when some event happens like receiving packets. As shown, the CPU non-idle cycles 450 includes the synchronous programming model functions 432 and async high-priority 422 (e.g., high-priority active asynchronous programming model functions).

In one or more implementations, the synchronous programming model functions 432 (e.g., passive sync) refers to the computations that the memory allocation system 106 executes synchronously when an external event like receiving packets occurs. This is often called passive sync because it does not need any thread and only executes when an external event happens. Further, passive can mean that the computation inside the passive component is triggered and executed only when the function is called.

In some implementations, the async high-priority 422 refers to computation that the memory allocation system 106 executes asynchronously when an external or internal event happens. For instance, an external event can include receiving a control command and an internal event can include a timer expiring, memory usage exceeding a limit, etc. Indeed, active async operations use the term "active" to indicate that an active component is triggered and executed when the function is called. In addition, the memory allocation system 106 also performs computations periodically as part of enumeration (e.g., via additional housekeeping/enumeration threads). According to some implementations, the priority between passive sync and async high-priority are the same. In certain implementations, entire CPU cycles are shared in an m:n ratio between passive sync and async high-priority.

As shown, FIG. 4B includes the CPU idle cycles 460 having the async high-priority 422, the async low-priority 424 (e.g., active asynchronous programming model functions), and the async optional-priority 425 operations. Stated differently, the async low-priority 424 can be shared with async high-priority 422 and executed when the CPU is idle and the async optional-priority 425 can be executed if additional CPU resources are available. In various implementations, after completing the passive synchronize and async high-priority functions, the CPU/threads cores may begin to enter in the CPU idle cycles 460. Accordingly, the memory allocation system 106 can capitalize on the available CPU resources by performing deferred servicing operations. In other words, the memory allocation system 106 can utilize the rest of the CPU cycles for async low-priority operations after async high-priority operations are complete.

In various implementations, the async low-priority 424 refers to computations that the memory allocation system 106 has deferred for later execution. For example, when these deferred computations arrive at the CPU idle cycles 460, the memory allocation system 106 can convert or execute them. Thus, under the PmemMalloc framework, each worker thread has a dedicated CPU core at the end of a sync task when the thread/CPU core goes to an idle state. But before going idle, the memory allocation system 106 executes the low-priority async computations.

Indeed, by performing computations in a deferred way (e.g., utilizing the async model), the memory allocation system 106 is better able to consume idle CPU cycles. In addition, in some implementations, the async low-priority 424 refers to computations that the memory allocation system 106 can be postponed, such as the zeroing of memory, expiry of objects, etc., which can be executed at a lower priority and when the CPU is idle.

In some implementations, the async optional-priority 425 refers to computations that the memory allocation system 106 has deferred for execution upon completing the async low-priority 424 operations. Alternatively, the memory allocation system 106 can disable the async optional-priority 425 when computing resources are otherwise needed. Examples of enumerations associated with the async optional-priority 425 include header/trailer validation and object content validation.

As noted above, the memory allocation system 106 provides various enumeration types and properties including high-priority enumeration, deferred-definite enumeration, deferred-indefinite enumeration, and deferred-optional enumeration. Indeed, as previously provided, high-priority enumeration are not deferred and can be similar to packet processing and other time-sensitive operations; deferred-definite enumeration includes operations that have the potential be starved out and, thus, the memory allocation system 106 promotes them high-priority to alleviate memory pressures, deferred-indefinite enumeration includes operations where the size gradually decreases even if enumeration is not active; and deferred-optional enumeration includes operations that are not guaranteed and can be stopped if computing resource are not sufficient. Further, regrading flags or properties of enumeration, these include recursive, user defined/system defined, multiple/single, memory release (e.g., these enumerations releases the memory), and priority among the deferred enumerations.

Figure 5:
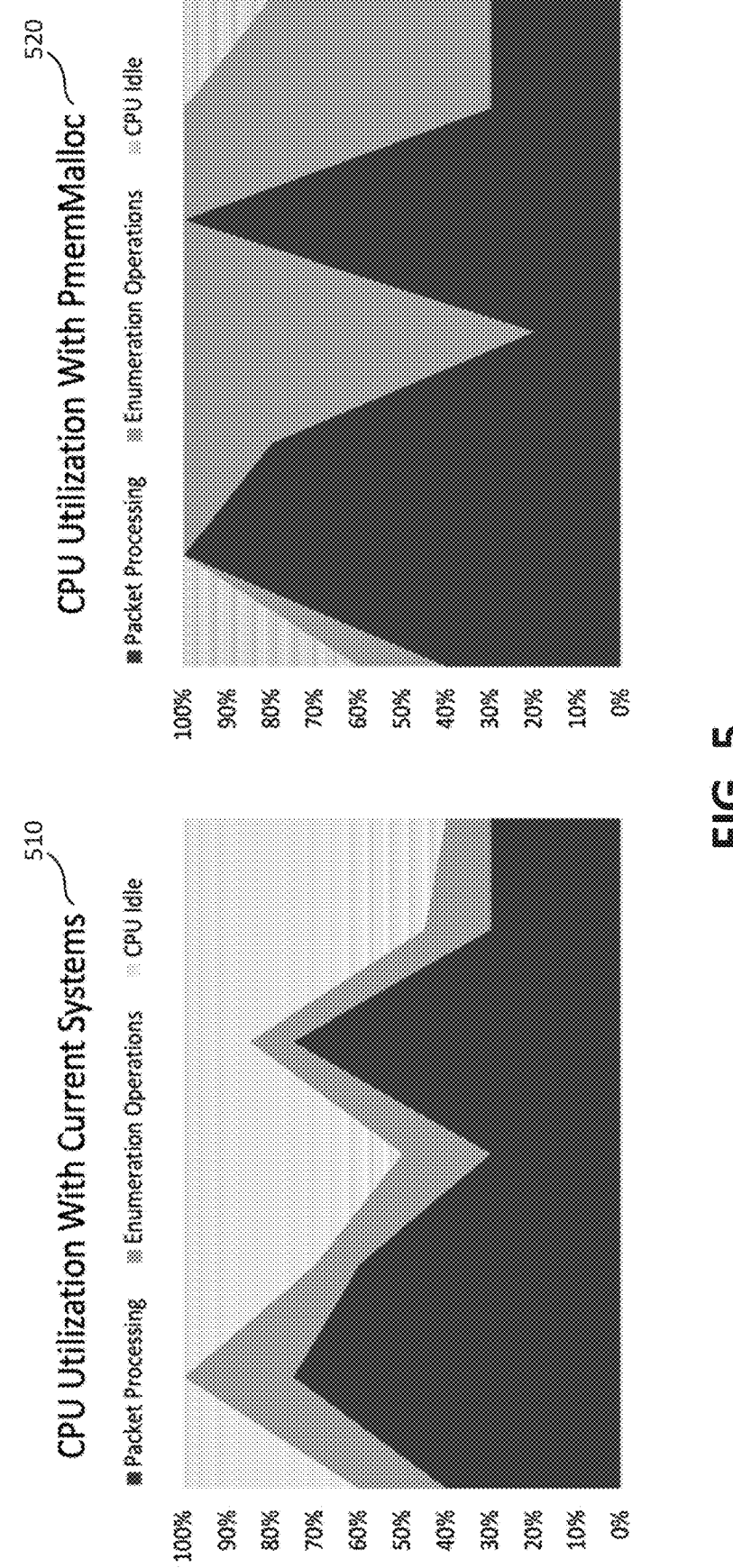
FIG. 5 illustrates graphs comparing CPU utilization between existing malloc libraries and the PmemMalloc library in accordance with one or more implementations.

As detailed above, the memory allocation system 106 provides several improvements over existing malloc libraries. To further illustrate, FIG. 5 shows graphs 500 comparing CPU utilization between existing malloc libraries and the PmemMalloc library in accordance with one or more implementations. As shown, FIG. 5 includes a first graph 510 of CPU utilization with current systems (e.g., existing malloc libraries) and a second graph 520 of CPU utilization with the PmemMalloc library utilized by the memory allocation system 106. In addition, the first graph 510 and the second graph 520 represent processing packet data with four CPU cores.

As shown, packet processing (e.g., the black area) in the first graph 510 peaks out at 75% of full CPU utilization because existing malloc libraries horizontally split the CPU cores and they cannot use the fourth CPU core, which is allocated to enumeration by an application. In contrast, as shown in second graph 520, the memory allocation system 106 can packet process across all of the CPU cores.

Additionally, the first graph 510 shows that existing malloc libraries cannot use all the CPU resources when packet processing eases. As a result, the first graph 510 includes large amounts of idle CPU cycles (e.g., the lightest area at the top). In contrast, because the memory allocation system 106 can distribute operations across each of the CPU cores as well as perform all object operation types on any CPU core, the second graph 520 shows very little amounts of idle CPU cycles. Further, because the memory allocation system 106 can defer some enumeration tasks, the memory allocation system 106 can devote more of the CPU cores to deferred enumeration tasks when packet processing is low.

The following disclosure proves additional detail regarding one or more of the implementations of the memory allocation system 106 described above. As noted, the memory allocation system 106 employs an active async model within the framework of a PmemMalloc library. As advantages of active async, all worker threads (e.g., CPU cores) can operate in their own memory partition, which is pre-allocated to minimize the lock contention to near zero. By doing this, the throughput of the computing device (e.g., a server) will increase.

In particular, the computing device the distribution of CPU cycles equally among the CPU cores (e.g., computation is equally distributed to all the cores assigned to DPDK worker threads). Further, computations are parallelly done with a lockless or near lockless state, which enables processing throughput to rise to its highest level (e.g., each CPU core/thread uses a separate memory partition that is pre-allocated and async computations will be walking or scanning the memory partition at different priority levels with a lockless state, and contention between threads or CPU cores are near zero).

With respect to lockless-ness, in various implementations, the memory allocation system 106 provides various constructs of lockless-ness. To illustrate, for lockless-ness, related to this construct, there can be three inter-related subconstructs: a) lazy-free, b) lockless-ness, and c) zero-free or memory leak detection. For lazy-free, all objects in PmemMalloc can be lazily freed. Lazy-free can be implemented by tagging an object as freed so that majority of the computations related to the free are deferred. Also, lazy-free is a lightweight free and the garbage can be collected in a deferred manner. The advantage of configuring lazy-free is it gives more CPU cycles to packet processing. As per test data, malloc and free take equal computations mean doing lazy-free will decrease the computations from malloc-frees by 40-50% and these CPUs can be consumed for packet processing. Indeed, as noted above, the PmemMalloc library supports various Free variations including normal-free, zero-free, lazy-free. Further, the PmemMalloc library enables a Free to be transparently changed to lazy-free without affecting current application code (e.g., from the point of view of the application code, not change is detected).

For lockless-ness, to make PmemMalloc run in a lockless mode, the memory allocation system 106 many need cross-malloc, and cross-frees need to be disabled. Cross-malloc means memory is allocated from one core but owned by another core. If the data thread does not have free memory in its own memory partition, PmemMalloc will get memory from the neighboring partition. This will use the memory optimally but at the cost of locks. If the packets are sharded to all CPUs equally, then cross-malloc can be disabled since it saves less memory. Cross-frees mean the memory is freed from one core but owned by another core. For cross-frees, any thread can free any object, so cross-frees will need locks. But if PmemMalloc is configured with lazy-free, then cross-frees will get disabled automatically.

For zero-free or memory leak detection, free API may not be required from the application and the object can be garbage collected in some instances. In PmemMalloc, every object includes a timestamp as part of its metadata. So, if the object is not freed or updated, then PmemMalloc can detect it as part of system enumerations and notify the application that a particular object is subject to a leak. Then, the memory allocation system 106 and/or application can free it. If the PmemMalloc is configured with zero-free, then cross-frees will be disabled automatically. But the application can still call the free it explicitly, which is internally interpreted as lazy-free.

Further, the PmemMalloc library can include PmemMalloc primitives, such as non-OOM and memory-leak-detection. For non-OOM, OOM will never happen in the PmemMalloc library due to pre-allocated memory. For memory-leak-detection, PmemMalloc is free of memory leaks due to the timestamp being attached to the object. Indeed, the memory allocation system will detect the leak and notify the application and/or fix the memory leak.

Additionally, regarding the application impact of zero-free on Application, during packet processing of memory intensive applications, the application will broadly request a processing type of a) create/update or b) delete with computation being about the same to complete each type). There is also an internal operation call object expiry, which is usually implemented as one or more timers. The end result of delete packet processing and object expiry will lead to the deletion of objects.

Additionally, one way to improve the speed of packet processing is to minimize the delete operation to be as small as possible. Accordingly, in various implementations, the memory allocation system 106 does this by, when a delete request arrives, instead of completing a delete, the memory allocation system 106 marks the main object as similar to expiry. Further, the memory allocation system 106 links the rest of the objects to the main object that will be deleted by the object expiry enumeration. Thus, rather than calling free, the memory allocation system 106 detects the expiry object and generates the callback in a deferred way.

In various implementations, the memory allocation system 106 performs zero-free similar to how Java collects objects for garbage. Accordingly, in pmemMalloc, the memory allocation system 106 can garbage collect only certain type of objects and then notify them to the application, so that the application issues lazy free or normal free to delete.

As additional advantages of active async, CPU idle cycles will be efficiently used as idle CPU cycles are used for deferred computation by walking all the memory objects parallelly. In some instances, if the CPU cores are busy with the requests, then active async computations can be automatically translated to passive sync. In some implementations, the memory allocation system 106 determines that the computing device (e.g., server) is busy when the percentage of CPU idle cycles is less than a first threshold or the number of packets received per second is higher than a second threshold. By doing the above, computations done outside the DPDK worker threads or computations done in control threads will be minimalized. Further, async active will facilitate offloading the computation from control threads to worker threads incrementally and when those computations are complete, the number of worker threads can be increased.

Moreover, the memory allocation system 106 provides several advantages by offloading computations from packet processing. Indeed, the memory allocation system 106 migrates computations from packet processing to deferred enumerations, which significantly improves the through put of packet processing and makes efficient use of CPU cycles that would otherwise be idle. For example, the memory allocation system 106 can offload Calloc, lazy-free, zero-free, and variable object expiry from packet processing.

To elaborate, the Calloc operation can include filling free blocks with zero asynchronously. During packet processing, the memory allocation system 106 saves applications from performing calloc computations with no change/minimum change in the application code. With the lazy-free operation, the memory allocation system 106 can convert all free calls to lazy-free. In lazy-free, an object will be freed during deferred enumeration. Here, no change in the application code in needed. In addition, with lazy-free operation, the memory allocation system 106 offloads packet processing and helps to make objects lockless (otherwise locks would have been needed for cross-frees under existing Malloc libraries).

With the zero-free operation, "delete-request" in packet processing becomes a light weight operations by the memory allocation system 106 offloading is to a deferred enumeration. Thus, instead of processing objects completely, partial object processing is done by tagging main object as zero-free object and having the rest of the objects be deleted as part of a deferred enumeration using a call back. As described above, the memory allocation system 106 transforms a delete request to be similar to object expiry. Object expiry is triggered due to an expiry time whereas a delete-request from the NIC will generate and/or tag an object with a zero-tag and these objects will be deleted in a deferred way, similar to object expiry.

With the variable object expiry operation, existing Malloc libraries can offload this task, but are not efficient because existing enumeration is a fixed object expiry and are also not efficient due to application enumeration. In contrast, the memory allocation system 106 efficiently offloads the variable object expiry operation with variable expiry idle cycles and free memory instead of fixed expiry.

As further advantages of active async, the memory allocation system 106 can increase DPDK worker threads by migrating the bulk computation from control threads: Thus, memory-intensive computations can be migrated from the control threads to parallel DPDK worker threads. By doing this, the computations can be executed parallelly with almost lockless. Also, the memory allocation system 106 can achieve high throughput with the same DPDK worker threads by distributing equal computation among worker threads with almost lockless, which can lead to high throughput when compared to the unequal distribution with locks of existing malloc libraries.

Above, enumeration (e.g., housekeeping operations) are mentioned as part of active async. In various implementations, the enumeration is a function called from the back plane just before the CPU is going idle and/or once every n packets. The enumeration consumes a small amount of CPU computation. In one or more implementations, the enumeration includes two types of tasks. The first task is a low-priority enumeration task. Here, when the CPU is idle, the low-priority enumeration is called. The second task is a high-priority task. Here, after processing every n packets, one enumeration is called.

In various implementations, an active async enumeration provides at least two constructs to solve problems to improve throughput and latency. Construct 1 includes converting synchronous computation to asynchronous computation. Here, computations that are executed during creating, updating, and terminating flow will be synchronous. This computation should be very efficient and should be as small as possible to get better latency and throughput. One way to accomplish this is to move/convert some of the existing synchronous computation into asynchronous, as detailed above. Indeed, asynchronous computation can be preponed or postponed so that synchronous becomes smaller.

To illustrate, with the example of zeroing memory blocks, computations will make synchronous computation smaller, reduce latency, and improve throughput. In various implementations, the memory allocation system 106 performs async zeroing when there are idle CPU cycles, otherwise during high load and zeroing will happen synchronously in the current way. With the example of servicing due to data structure change, flow transformations from an older version to a newer version can be postponed or delayed until it is needed by the memory allocation system 106. Currently, with existing malloc libraries, entire servicing requires a large synchronous computation and this causes a blackout/brownout period which interferes with the processing of new or existing flow.

In various implementations, Construct 2 includes distributing CPU computations/memory equally among all DPDK cores. Here, distributing the CPU and memory resources equally among all the DPDK cores (e.g., 4, 8, etc. cores) will improve the overall throughput (CPS) and latency, such as in the case of object expiry and live migration.

Regrading design details of the enumeration, in some implementations, the memory allocation system 106 utilizes an asynchronous paradigm (e.g., Pmem_Bulk) having two halves. For example, the asynchronous paradigm includes an upper half having call-backs in the application that provide business specifics and are registered before enumeration starts. In particular, the call-backs can occur each node/block and when the enumeration is completed in all CPU core partitions. Additionally, the asynchronous paradigm can include a bottom half having that includes the walking of all nodes of an enumeration (e.g., Pmem_Bulk). Here, the memory allocation system 106 can operate parallel for all partitions.

Additionally, regarding the life cycle of the asynchronous paradigm (e.g., Pmem_Bulk), the life cycle can register enumeration with flags and filters, receive call-backs for each block on multiple cores parallelly, and receive a single call-back when the enumeration is completed.

As noted above, the memory allocation system 106 can include various enumerations types for the asynchronous paradigm (e.g., Pmem_Bulk). For instance, the enumerations types can include high-priority types, which run along with packet processing by performing both packet processing and high-priority enumeration operations (where CPU cores are shared in the ratio of m:n between passive sync and async high-priority) and low-priority types, which runs only during CPU-idle time. However, in some implementations, when the memory the low, the memory allocation system 106 can provide low-priority types to be high-priority types if needed.

In addition, the enumerations types can include optional-priority types. The memory allocation system 106 can run optional-priority types during CPU-idle time. However, in various implementations, when the memory is low, the memory allocation system 106 can disable enumerations having optional-priority types.

To further illustrate, the following is an example algorithm for implementing enumerations for the asynchronous paradigm (e.g., Pmem_Bulk).

---

Pmem_Bulk: Enumeration Implementation Algorithm

```
While While (1) { /* 1. sync 2. High 3. Low 4. optional */
/* split CPU m: n between Sync and enumeration high in non-idle */
    Npkt = Poll_Recv_pkt(m); /* Sync */
    Npkt = Npkt + pmem_run_enumerate_high(n) /* run
    enumeration-high */
    If (Npkt ==0){
        Npkt = Pmem_run_enumerate_low_optional( ) /* run
        enumeration Low and
        Optional */
        If (Npkt == 0){
            Lcore_idle( ); /* kernel sleep, switch of interrupts */
} } }
```

---

Additionally, following in an example algorithm for enumerations (bulk operations) for the asynchronous paradigm (e.g., Pmem_Bulk).

Pmem_Bulk: computations are done on the core which owns memory with the help of metadata.

1. Task Registered: The task will be registered with Pmem_Bulk after the registration walk will be started.
2. Parallel and Equal CPU Contribution: All data threads walk all partitions independently. "complete callback" will be called when all walks are completed from all partitions. After, Task will be removed.

New Software Construct-1: Parallel: data is sharded across all partitions equally, the bulk operation will be more scalable if it is parallel, so the computation is divided among the parallel cores equally.

New Software Construct-2: Equal CPU Distribution: due to sharding the bulk computation data is sharded across all partitions, the bulk operation will be more scalable if it is parallel.
3. Deferred: low-priority walks during an idle cycle, high priority walk steal cycles from sync.

In Pmem_Bulk, the task will defer as much as possible till memory resources are comfortable with this idle cycles will be utilized to a maximum extent, and unused memory will be converted into extra CPU power.

Construct-3: Deferred: deferring memory computation: using as much as idle cycles as possible.
   a) extra memory: wait longer for idle cycles,
   b) extra CPU: using idle cycles.
   e.g., object expiry, object delete, port delete, validation, cleaning memory block, etc.
4. Lockless: it is lockless because the walk is done by the owner CPU.

Construct-4: Lockless: since there is one data thread per core, it does not require the lock.

5. Piggyback: All recurring tasks will use the same walk as that of any single non-recurring, it can piggyback on the top of any non-recurring task or dummy task (saves CPU computations).

Construct-5: Piggyback: multiple tasks with one walk by performing the call-backs one after another on the same object. This greatly reduces the cost. (e.g., object expiry, port delete, object delete, object validation, etc., all these use the same walk, they can start at any point of the walk.)

6. Non-recurring: Non-recurring task as separate walk for each. It strictly starts from the first block and completes when reaches the end.

Pmem_Bulk: Bulk Operation Algorithm

As mentioned above, existing malloc libraries do not support enumeration and must rely on applications to perform enumerations. The following tables provide comparisons between enumeration in application and enumeration in utilizing the PmemMalloc library.

TABLE 1

|  | Enumeration in Application | Enumeration in Pmem Malloc |
|---|---|---|
| Insert, Delete, Update | Hash tables | Virtual Addresses where the first few bits give the location |
| Walking of Objects | Linked list | Linked list |
| Threading/Parallelism | Singe threads | Parallel |
| Lock | Global lock | lockless |
| Consuming of Objects | Walking and consuming of objects are tightly coupled. They are done synchronously | Consuming of objects are Asynchronously using call-backs. |
| Additional Memory | Additional Memory for Enumeration | Not required |
| CPU Distribution | Leads to Unequal CPU distribution | Equal CPU distribution |
| Deferred | Very limited deferred, not linked to memory. | Definite Deferred till available memory, Indefinite Deferred with various properties. |
| Packet Processing Offload | N/A | Various offloads using rich set of Enumerations. |
| High priority Enumeration | N/A | Runs faster , along with packet processing. |
| Lockless and Cross-Frees | Cross frees | Lockless and zero cross-frees |
| Multiple Enumerations at the Same Time | N/A | Piggyback |
| Variable Object Expiry | N/A | Deferred due to available memory |
| Lightweight Free (lazy-free) | N/A | Deferred free |
| Zero-Free | N/A | Deferred Delete |
| Control Memory Pressure | OOM (Out Of Memory) | Bring some block operations to the forefront to free objects when free memory is less than 10% |
| Enumeration Types | Only One | High Priority, Deferred-finite, Deferred-indefinite, Deferred-Optional |
| Debuggability | NA | Enumeration Metadata present in Shared memory, can monitor from outside |
| CPU Cache/ Memory Cache | More noise to neighbouring cores due to global data | Enumeration is local, so CPU will be accessing the memory, which it owns, without causing noise to the neighbouring CPU. |

As shown in Table, 1, regarding the walking of objects, in an application, the data structure used is not uniform and there are different methods for different enumerations. In PmemMalloc, it is uniform and done two ways: a) using linked list b) sequential scan. Sequential scan is used when multiple enumerations are piggybacked and the filter is mostly generic.

Regarding the additional memory for each enumeration, the application needs additional data structures like hash tables with linked list to do the enumerations. This memory is proportional to the enumeration size. PmemMalloc does not need any additional memory. Instead, it needs small amounts of memory to maintain metadata for enumeration. This small memory is created during enumeration registration.

Regarding the additional code for each enumeration, the application needs separate functions to walk the enumerations list. This mostly not re-usable between different enumerations. In PmemMalloc, very generic/similar code is used for all enumerations.

Regarding the async framework for enumeration, in the application, enumeration walks and functions to execute on each node visit, and the code is tightly coupled between walking and executing the node. In PmemMalloc, walking and executing/consuming the node can be completely decoupled. Thus, enumeration walking is done in a generic way by the memory allocation system 106 and consumption is done by callbacks in the applications.

Regarding zero-free, this is not available in the application. The memory allocation system 106 can utilize a callback to the application to free the block due to object expiry. Regarding memory leak detection, this is not available in the application, In PmemMalloc, this functions is very similar to zero-free. However, zero free is intentional and memory leak is un-intentional.

Regarding the CPU cache/memory cache, in the application, since the enumeration is global, there will be more noise for memory cache. In PmemMalloc, enumeration is local, so the CPU will be accessing the memory, which it owns, without cause noise to the neighboring CPU. Additionally, since it is a bulk operation, it disturbs the CPU cache due to large scans, but this happens during non-packet processing time for all the cores, and this is for non-high priority enumeration. Further, assuming such high-priority enumeration are less, the memory locality build during the packet processing stage will be intact if all other cores also busy with packet processing. during the deferred enumeration and there will be a lot of churn in the memory in all the cores.

Regarding debuggability, in PmemMalloc, since enumeration metadata is present in the shared memory, it can easily be monitored from the outside without interfacing the application. As another advantage, the memory allocation system 106 can monitor all enumerations, which includes determining at what stage the walk is and how much work is left.

Further regarding debuggability, in various implementations, the memory allocation system 106 can provide a standalone application (e.g., called PmemAnalyser) that reads the PmemMalloc shared memory in read-only mode. Then, using the metadata and heaps, the memory allocation system 106 can extract the information from outside. For instance, the memory allocation system 106 can extract information regarding an object tree (e.g., which object is linked to which other objects in the system), memory leak (e.g., based on timestamp and orphan objects, memory leak will be detected (orphan objects are the objects not linked to any other objects)), detailed CPU computation split (e.g., how CPU cycles are spend on packet processing, all type of enumerations and idle cycles, when a threads switches from one type of computation to another it records timestamp in partition region of a shared memory), and metrics related to the heap.

TABLE 2

| Software Constructs | Application (Current) | Pmem Malloc |
|---|---|---|
| Parallelism | Single thread | Parallel thread |
| CPU Distribution | Unequal CPU distribution | Equal CPU distribution |
| Deferred | Very limited deferred | Deferred due to idle CPU or available memory. Multiple block operations can be deferred. |
| Lockless and Cross-Frees | Cross frees | Lockless and zero cross-frees |
| Multiple Bulk Operations at a Time | N/A | Piggyback |
| Variable Object Expiry | N/A | Deferred due to available memory |
| Priority between Block Operation | N/A | Priority |
| Lightweight Free | N/A | Deferred free |
| Control Memory Pressure | OOM (Out Of Memory) | Bring some block operations to the forefront to free objects when free is less than 10% |
| Optional Enumeration: Object Validation | N/A | Possible |
| Optional Enumeration: Data Validation(f-star) | N/A | Possible |

Regarding deferred-ness, the following provides additional details regarding the memory allocation system 106 deterring enumeration operations. In various implementations, differed-ness involves improving throughput by postponing low-priority computation for the throughput of high-priority one. In some implementations, computations include passive sync, high, low, and optional priority computations. As noted above, the memory allocation system 106 can perform passive sync and high-priority enumeration as soon as possible. Further, the memory allocation system 106 can defer low and optional enumerations as long as free memory and/or idle CPU is available.

In various implementations, deferred-ness provides a jitter buffer mechanism. For example, deferred-ness can improve throughput and latency by consuming idle cycles and free memory (e.g., it gives its own cycles to sync/high computation). Additionally, deferred-ness allows the memory allocation system 106 can decide the throughput for low-priority and optional-priority enumeration. Further, deferred-ness provides a mechanism to consume idle cycles as much as possible until there are no-idle with less free memory, and when free memory exceeds enumeration, the memory allocation system 106 can wait for idle cycles for a long period.

With respect to memory, deferred-ness requires less memory as processing can wait for CPU idle cycles for short period, and thus, consume less amount of idle cycles. Indeed, by deferring, fewer enumerations are running at high priority than with existing malloc libraries. Additionally, with more free memory, the memory allocation system 106 can wait for idle CPU cycles for a long period, so it consumes greater amounts of idle CPU cycles. Further, because incoming packets and high-priority are not uniform, deferred-ness allows the memory allocation system 106 to better handle and more quickly process bursts of incoming packet data. (e.g., deferred-ness acts as a jitter buffer).

In some implementations, the memory allocation system 106 controls deferred-ness by increasing/continuing low-deferred-ness if the available free memory >15%, decreasing low-deferred-ness by moving low to high if free memory <15%, stopping low-deferred-ness by moving all low to high if free memory <5%, and/or disabling optional enumerations if free memory <30%.

In one or more implementations, the memory allocation system 106 measures performance improvement from deferred-ness by identifying the percentage of CPU cycles consumed by low-enumeration (e.g., when the CPU is in an idle state). For example, when 70 units are idle and 30 units are non-idle, the memory allocation system 106 determines that deferred-ness contributed 70 more units of CPU to passive sync/high-priority enumerations by deferring low-priority and optional-priority enumerations to the CPU idle state.

Figure 6:
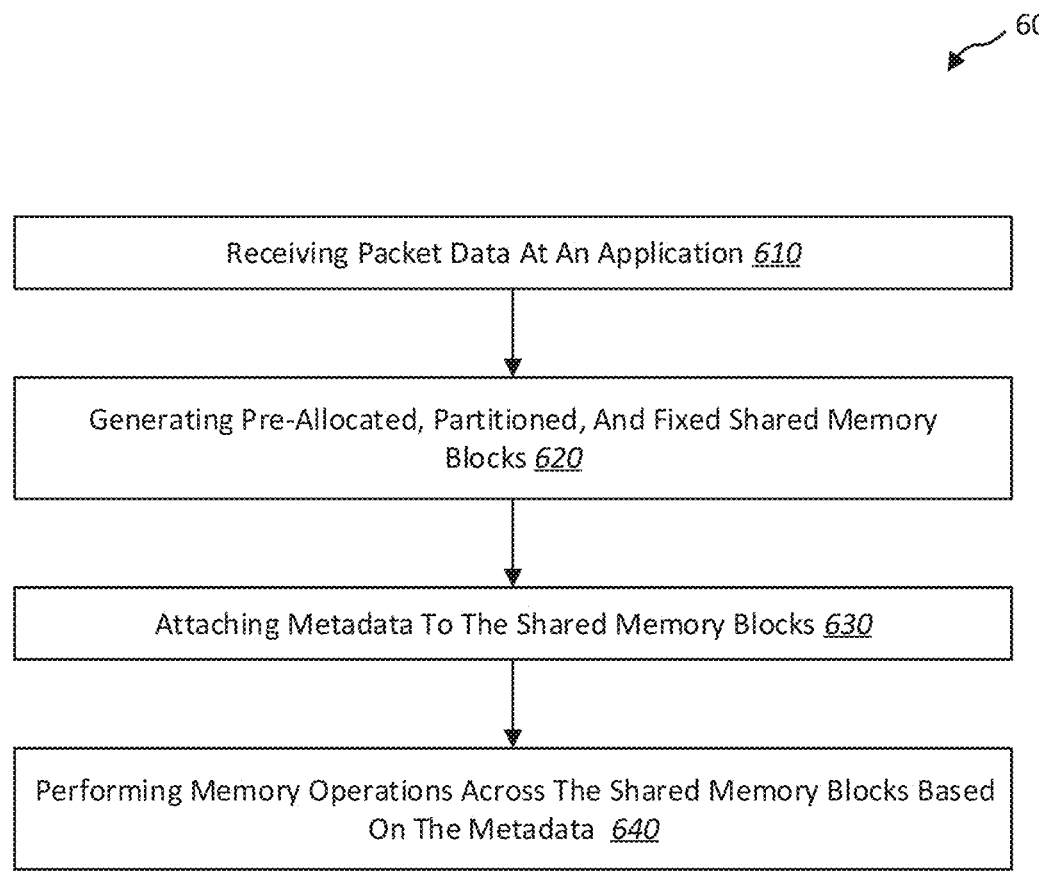
FIG. 6 illustrates an example series of acts for servicing packet data utilizing a new memory allocator library (i.e., PmemMalloc) in accordance with one or more implementations.

Turning now to FIG. 6, this figure illustrates an example flowchart including a series of acts 600 for utilizing a memory allocator library and/or managing memory to facilitate packet data processing in accordance with one or more implementations. While FIG. 6 illustrates acts according to one or more implementations, alternative implementations may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further implementations, a system can perform the acts of FIG. 6.

For example, FIG. 6 illustrates a series of acts 600 for servicing packet data utilizing a new memory allocator library (i.e., PmemMalloc). The series of acts 600 includes an act 610 of receiving packet data at an application. For instance, the act 610 may involve receiving packet data over a network device that includes an application that processes the packet data. In certain implementations, the act 610 includes receiving the packet data corresponding to the application from a network interface card before flows are converted into new objects. In some implementations, the act 610 includes receiving the packet data corresponding to the application from a network interface card before flows are converted into new objects.

As further shown, the series of acts 600 includes an act 620 of generating pre-allocated, partitioned, and fixed shared memory blocks. For example, the act 620 may involve generating a memory heap within shared memory blocks that are pre-allocated, partitioned, and fixed in response to receiving the packet data. In some implementations, the memory heap of the shared memory blocks includes memory that persists across rebooting or restarting the application. In various implementations, the memory heap of the shared memory blocks is pre-allocated without operating system integration. In one or more implementations, the act 620 includes pre-allocating and partitioning the shared memory blocks across a fixed number of data threads, a fixed number of CPUs, and a fixed amount of memory. In example implementations, CPU computations and the shared memory blocks occur on a data plane development server device.

As further shown, the series of acts 600 includes an act 630 of attaching metadata to the shared memory blocks. For example, the act 630 may include attaching allocation metadata to each block of the shared memory blocks. In various implementations, the act 630 includes generating the allocation metadata for each block of the shared memory blocks before attaching the allocation metadata to corresponding blocks of the shared memory blocks. In some implementations, allocation metadata for each block of the shared memory blocks includes an object type, timestamp, and port number.

As further shown, the series of acts 600 includes an act 640 of performing memory operations across the shared memory blocks based on the metadata. For example, the act 640 may involve performing one or more memory operations across the shared memory blocks based on the allocation metadata. In some implementations, the one or more memory operations include packet processing operations or enumeration operations. In certain implementations, the act 640 includes performing the one or more memory operations a data thread on which a corresponding memory block is created (or owned).

In one or more implementations, the act 640 includes performing the one or more memory operations across the shared memory blocks further based on priority levels of the enumeration operations including a high-priority bulk operation, a low-priority operation, and/or an optional-priority operation. In some implementations, the act 640 includes performing the one or more memory operations across the shared memory blocks further includes processing high-priority bulk operations while deferring low-priority bulk operations until CPU idle time increases beyond a threshold level.

In various implementations, the act 640 includes filtering out memory blocks from the shared memory blocks based on object types and performing an enumeration operation on the filtered memory blocks having a same object type. In certain implementations, the act 640 includes sharding the packet data across the shared memory blocks, performing the one or more memory operations in parallel across the shared memory blocks, and performing both packet processing operations and enumeration operations across multiple CPU data threads utilizing the shared memory blocks.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the memory allocation system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 7:
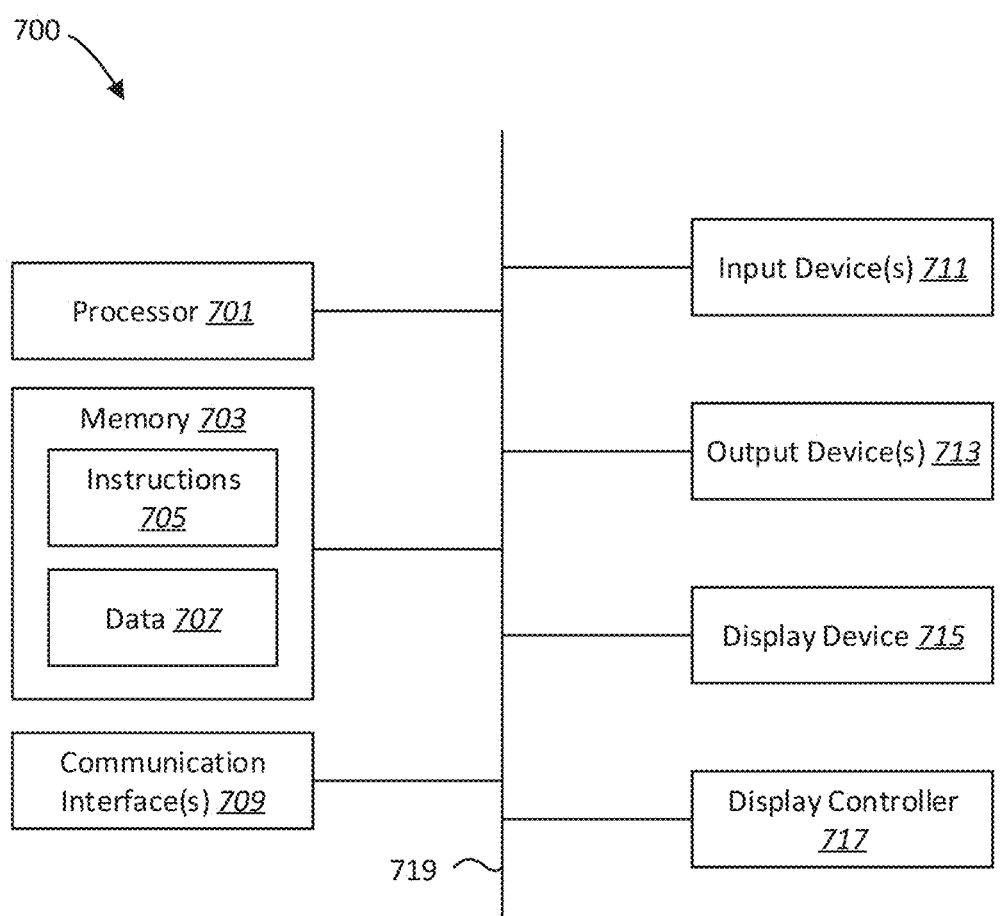
FIG. 7 illustrates certain components that may be included within a computer system.

FIG. 7 illustrates certain components that may be included within a computer system 700. The computer system 700 may be used to implement the various computing devices, components, and systems described herein.

In various implementations, the computer system 700 may represent one or more of the client devices, server devices, or other computing devices described above. For example, the computer system 700 may refer to various types of client devices capable of accessing data on a cloud computing system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. a specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for managing memory, comprising:
    creating shared memory blocks that are pre-allocated, partitioned, and fixed in size, the shared memory blocks being accessible by multiple applications;
    subsequent to completion of creating the shared memory blocks, receiving packet data at a network device that comprises an application that processes the packet data;
    in response to receiving the packet data, processing the packet data by creating a memory heap within the shared memory blocks upon receiving the packet data, wherein the shared memory blocks are pre-allocated within a memory region, partitioned in the memory region, and fixed in size within the memory region, and wherein the shared memory blocks are accessible by multiple applications, wherein the memory heap persists across rebooting or restarting the application and does not involve operating integration;
    generating allocation metadata for each block of the shared memory blocks, wherein the allocation metadata includes an object type of packet data portions stored in each block of the shared memory blocks;
    attaching the allocation metadata to each corresponding block of the shared memory blocks; and
    performing one or more memory operations to perform packet processing operations on the packet data and perform enumeration operations across the shared memory blocks based on the allocation metadata.

2. The computer-implemented method of claim 1, further comprising generating the allocation metadata for each block of the shared memory blocks before attaching the allocation metadata to corresponding blocks of the shared memory blocks.

3. The computer-implemented method of claim 2, wherein the allocation metadata for each block of the shared memory blocks comprises a timestamp, and a port number.

4. The computer-implemented method of claim 3, wherein the enumeration operations include zero blocking, servicing with data structure change, object expiry, port delete, and memory leak detection.

5. The computer-implemented method of claim 4, wherein performing the one or more memory operations across the shared memory blocks is further based on priority levels of the enumeration operations comprising a high-priority bulk operation, a low-priority operation, and an optional-priority operation.

6. The computer-implemented method of claim 5, wherein performing the one or more memory operations across the shared memory blocks further comprises processing high-priority bulk operations while deferring low-priority bulk operations until CPU idle time increases beyond a threshold level.

7. The computer-implemented method of claim 4, wherein performing the one or more memory operations across the shared memory blocks comprising:
    filtering memory blocks from the shared memory blocks based on object types; and
    performing an enumeration operation on the filtered memory blocks having a same object type.

8. The computer-implemented method of claim 1, wherein performing the one or more memory operations across the shared memory blocks comprising:

sharding the packet data across the shared memory blocks; and
    performing both the packet processing operations and the enumeration operations across multiple CPU data threads utilizing the shared memory blocks.

9. The computer-implemented method of claim 1, wherein the memory heap of the shared memory blocks comprises memory that persists across rebooting the application.

10. The computer-implemented method of claim 1, wherein the memory heap of the shared memory blocks is pre-allocated without operating system integration.

11. The computer-implemented method of claim 1, further comprising receiving the packet data corresponding to the application from a network interface card before flows are converted into new objects.

12. The computer-implemented method of claim 1, wherein generating the memory heap of the shared memory blocks comprising pre-allocating and partitioning the shared memory blocks across a fixed number of data threads, a fixed number of CPUs, and a fixed amount of memory.

13. The computer-implemented method of claim 1, wherein CPU computations and the shared memory blocks occur on a data plane development server device.

14. The computer-implemented method of claim 1, wherein performing the one or more memory operations across the shared memory blocks based on the allocation metadata comprises filtering and selecting one or more shared memory blocks that include a same metadata object type for combined processing.

15. A system comprising:
    at least one processor; and
    a non-transitory computer memory comprising instructions that, when executed by the at least one processor, cause the system to:
        create shared memory blocks that are pre-allocated, partitioned, and fixed in size, the shared memory blocks being accessible by multiple applications;
        subsequent to completion of creating the shared memory blocks, receive packet data at a network device that comprises an application that processes the packet data;
        in response to receiving the packet data, process the packet data by creating a memory heap within the shared memory blocks upon receiving the packet data, wherein the shared memory blocks are pre-allocated within a memory region, partitioned in the memory region, and fixed in size within the memory region, and wherein the shared memory blocks are accessible by multiple applications, wherein the memory heap persists across rebooting or restarting the application and does not involve operating integration;
        generate allocation metadata for each block of the shared memory blocks, wherein the allocation metadata includes an object type of packet data portions stored in each block of the shared memory blocks;
        attach the allocation metadata to each corresponding block of the shared memory blocks; and
        perform one or more memory operations to perform packet processing operations on the packet data and perform enumeration operations across the shared memory blocks based on the allocation metadata.

16. The system of claim 15, wherein performing the one or more memory operations across the shared memory blocks is further based on priority levels of the enumeration operations that comprise a high-priority bulk operation and a low-priority operation.

17. The system of claim 15, further comprising additional instructions that, when executed by the at least one processor, cause the system to receive the packet data corresponding to the application from a network interface card before flows are converted into new objects.

18. The system of claim 15, wherein generating the memory heap of the shared memory blocks comprising pre-allocating and partitioning the shared memory blocks across a fixed number of data threads, a fixed number of CPUs, and a fixed amount of memory.

19. A non-transitory computer-readable storage medium comprising instructions that, when executed by at least one processor, cause a computing device to:

create shared memory blocks that are pre-allocated, partitioned, and fixed in size, the shared memory blocks being accessible by multiple applications;

subsequent to completion of creating the shared memory blocks, receive packet data at a network device that comprises an application that processes the packet data;

in response to receiving the packet data, process the packet data by creating a memory heap within the shared memory blocks upon receiving the packet data, wherein the shared memory blocks are pre-allocated within a memory region, partitioned in the memory region, and fixed in size within the memory region, and wherein the shared memory blocks are accessible by multiple applications, wherein the memory heap persists across rebooting or restarting the application and does not involve operating integration;

generate allocation metadata for each block of the shared memory blocks, wherein the allocation metadata includes an object type of packet data portions stored in each block of the shared memory blocks;

attach the allocation metadata to each corresponding block of the shared memory blocks; and perform one or more memory operations to perform packet processing operations on the packet data and perform enumeration operations across the shared memory blocks based on the allocation metadata.

20. The non-transitory computer-readable storage medium of claim 19, further comprising additional instructions that, when executed by the at least one processor, cause the computing device to generate the allocation metadata for each block of the shared memory blocks before attaching the allocation metadata to corresponding blocks of the shared memory blocks, and wherein:

the allocation metadata for each block of the shared memory blocks comprises a timestamp, and a port number; and performing the one or more memory operations across the shared memory blocks is further based on priority levels of the enumeration operations comprising a high-priority bulk operation, a low-priority operation, and an optional-priority operation.

* * * * *